United States Patent
Fischer et al.

(10) Patent No.: US 10,525,927 B2
(45) Date of Patent: *Jan. 7, 2020

(54) SELF-CONFORMING REARSEAT AIR BAG

(71) Applicant: TRW Vehicle Safety Systems Inc., Washington, MI (US)

(72) Inventors: Kurt F. Fischer, Leonard, MI (US); Roy Turnbull, Shelby Township, MI (US); Douglas M. Gould, Lake Orion, MI (US); Michael Stegmeier, Schwaebisch Gmuend (DE); Christof Werner, Schwaebisch Gmuend (DE); Simon Schmid, Heuchlingen (DE)

(73) Assignees: TRW AUTOMOTIVE GMBH, Alfdorf (DE); TRW VEHICLE SAFETY SYSTEMS INC., Washington, MI (US)

( * ) Notice: Subject to any disclaimer, the term of this patent is extended or adjusted under 35 U.S.C. 154(b) by 144 days.

This patent is subject to a terminal disclaimer.

(21) Appl. No.: 15/728,573

(22) Filed: Oct. 10, 2017

(65) Prior Publication Data
US 2018/0043852 A1    Feb. 15, 2018

Related U.S. Application Data

(60) Continuation-in-part of application No. 15/629,833, filed on Jun. 22, 2017, now Pat. No. 10,336,282, (Continued)

(51) Int. Cl.
*B60R 21/207* (2006.01)
*B60R 21/231* (2011.01)
(Continued)

(52) U.S. Cl.
CPC .......... *B60R 21/231* (2013.01); *B60R 21/233* (2013.01); *B60R 21/207* (2013.01); (Continued)

(58) Field of Classification Search
CPC ........ B60R 21/231; B60R 2021/23153; B60R 21/207; B60R 2021/23308; B60R 2021/23386; B60R 2021/23388
See application file for complete search history.

(56) References Cited

U.S. PATENT DOCUMENTS

| | | | |
|---|---|---|---|
| 2,834,606 A | 5/1958 | Bertrand | |
| 3,617,073 A | 11/1971 | Landsman et al. | |

(Continued)

FOREIGN PATENT DOCUMENTS

| | | | |
|---|---|---|---|
| DE | 10325124 | | 12/2004 |
| DE | 10 2014 005 827 A1 | * | 10/2015 |

(Continued)

*Primary Examiner* — Ruth Ilan
(74) *Attorney, Agent, or Firm* — Tarolli, Sundheim, Covell & Tummino LLP

(57) ABSTRACT

An apparatus (10) for helping to protect an occupant (20) of a vehicle (12) having a seat (16 or 22) for receiving the occupant (20) includes an inflatable protection device (14) inflatable from a stored condition in the vehicle (12) adjacent a reaction surface (19, 23, 36) to a deployed condition between the reaction surface and the vehicle occupant (20). The protection device (14) includes a front portion (62) presented toward the seat (22) and an inflatable volume for receiving a penetrating occupant (20') when the protection device (14) is in the deployed condition. A rear portion (64) connected to the front portion (62) has an inflatable volume spaced from the front portion (62) by a space (110). The front portion (62) is positioned between the vehicle occupant (20) and the rear portion (64) when the protection device (14) is in the deployed condition. The inflated front portion (62) is movable in a fore-aft direction relative to the rear portion (64) to engage the occupant (20) regardless of the distance between the reaction surface (19, 23, 36) and the occupant (20).

15 Claims, 16 Drawing Sheets

Related U.S. Application Data which is a division of application No. 14/583,856, filed on Dec. 29, 2014, now Pat. No. 9,707,921.

(60) Provisional application No. 62/066,605, filed on Oct. 21, 2014, provisional application No. 62/067,075, filed on Oct. 22, 2014.

(51) Int. Cl.
*B60R 21/2338* (2011.01)
*B60R 21/233* (2006.01)
*B60R 21/213* (2011.01)

(52) U.S. Cl.
CPC ... *B60R 21/213* (2013.01); *B60R 2021/23115* (2013.01); *B60R 2021/23153* (2013.01); *B60R 2021/23308* (2013.01); *B60R 2021/23386* (2013.01)

(56) References Cited

U.S. PATENT DOCUMENTS

| | | |
|---|---|---|
| 3,791,667 A | 2/1974 | Haviland |
| 5,743,554 A | 4/1998 | Friedrich et al. |
| 8,622,417 B1 | 1/2014 | Schneider et al. |
| 9,308,883 B1 | 4/2016 | Schneider |
| 2004/0174003 A1 | 9/2004 | Dominissini |
| 2007/0296186 A1 | 12/2007 | Kwon |
| 2011/0001307 A1 | 1/2011 | Mendez |
| 2011/0049846 A1 | 3/2011 | Hirth et al. |
| 2012/0049492 A1 | 3/2012 | Choi et al. |
| 2012/0133114 A1 | 5/2012 | Choi et al. |
| 2012/0193896 A1 | 8/2012 | Turnbull et al. |
| 2017/0291566 A1* | 10/2017 | Karlow ................. B60R 21/276 |
| 2019/0061668 A1* | 2/2019 | Zhang ................... B60R 21/207 |
| 2019/0077356 A1* | 3/2019 | Patel ..................... B60R 21/216 |

FOREIGN PATENT DOCUMENTS

| | | |
|---|---|---|
| GB | 2362139 | 11/2001 |
| JP | 2012101568 | 5/2012 |
| WO | 2007060515 | 5/2007 |
| WO | 2008030144 | 3/2008 |
| WO | 2008095615 | 8/2008 |
| WO | 2010036162 | 4/2010 |
| WO | 2014016432 | 1/2014 |
| WO | 2015120970 | 8/2015 |

* cited by examiner

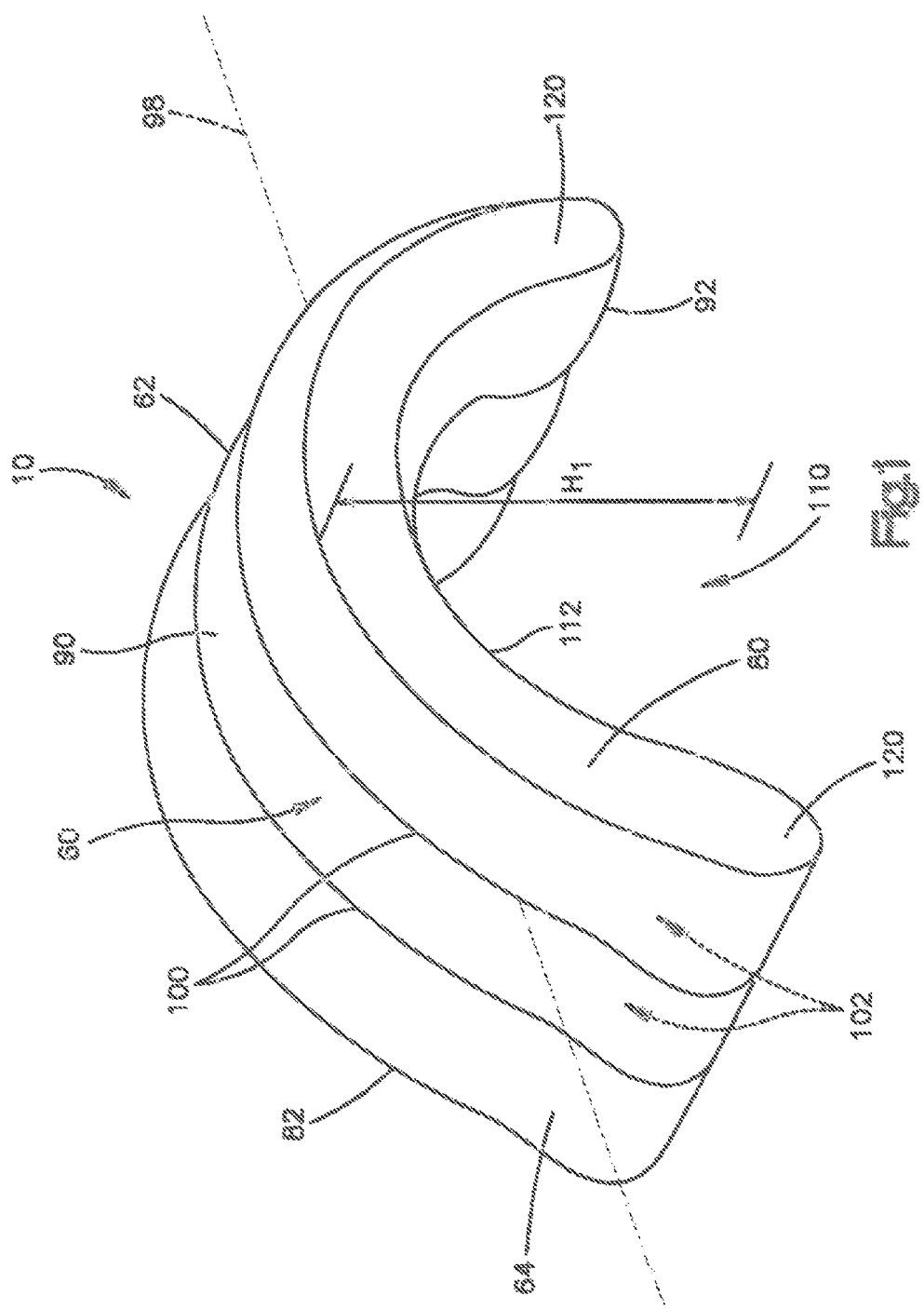

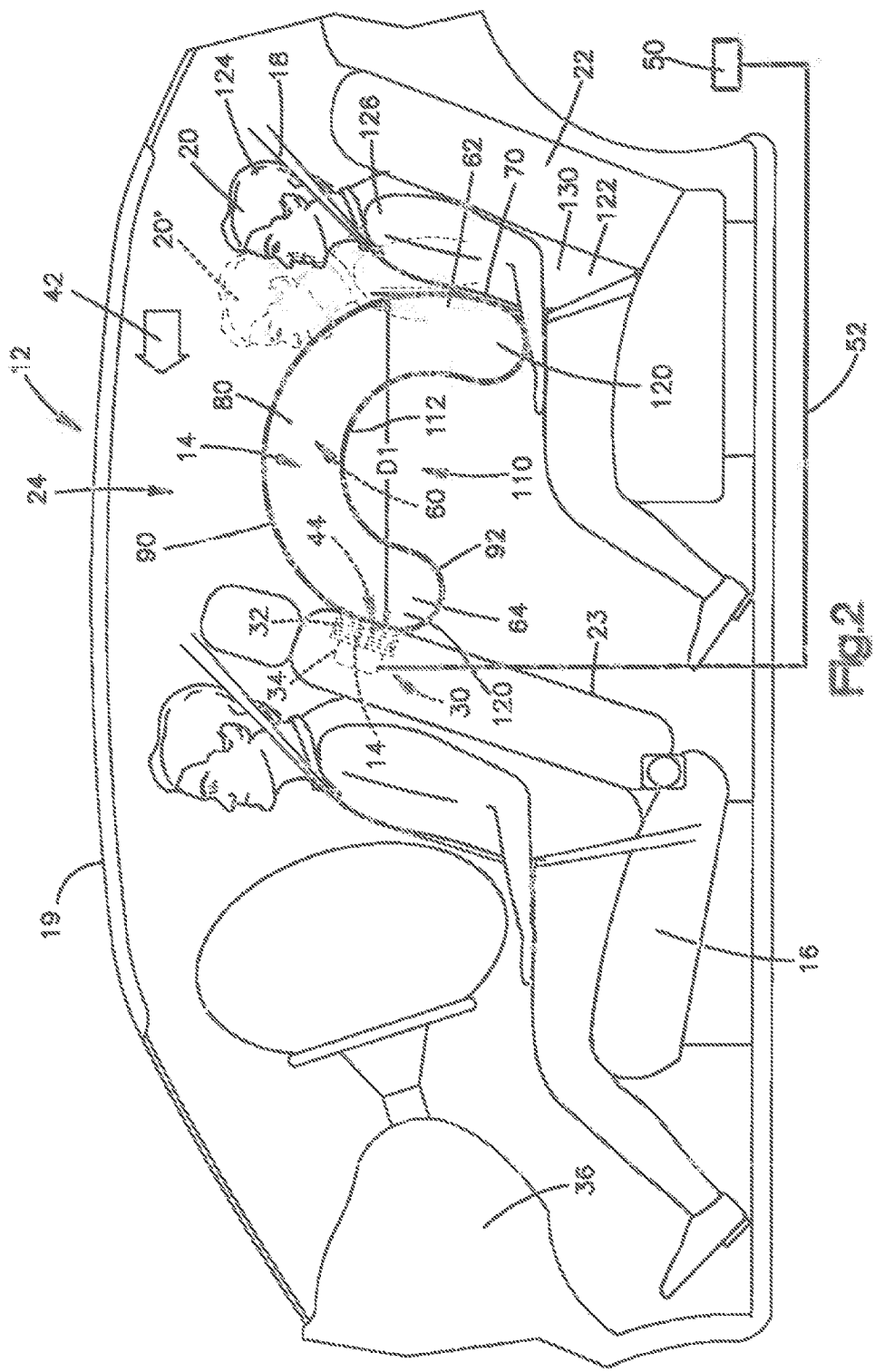

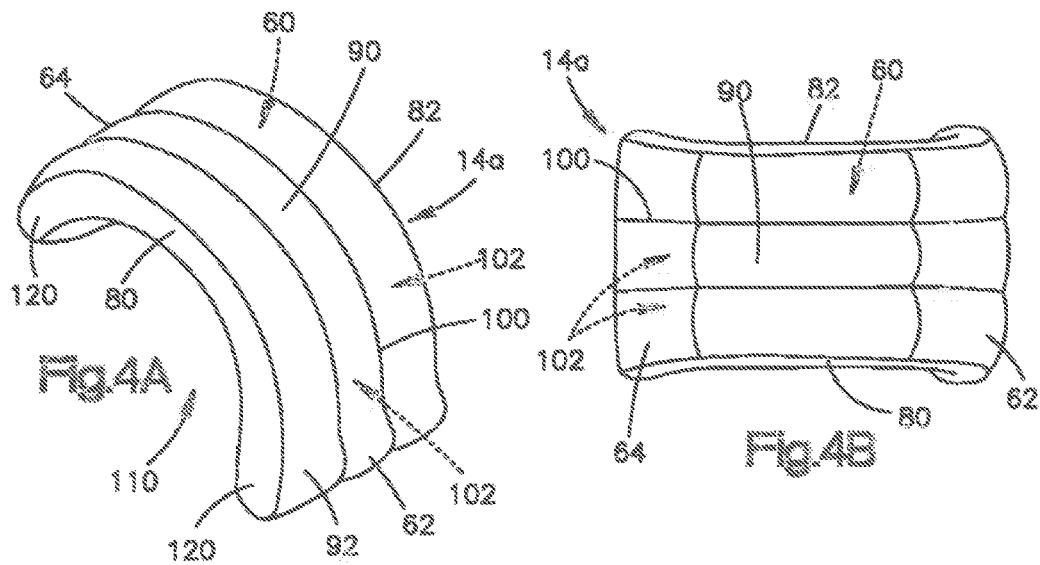
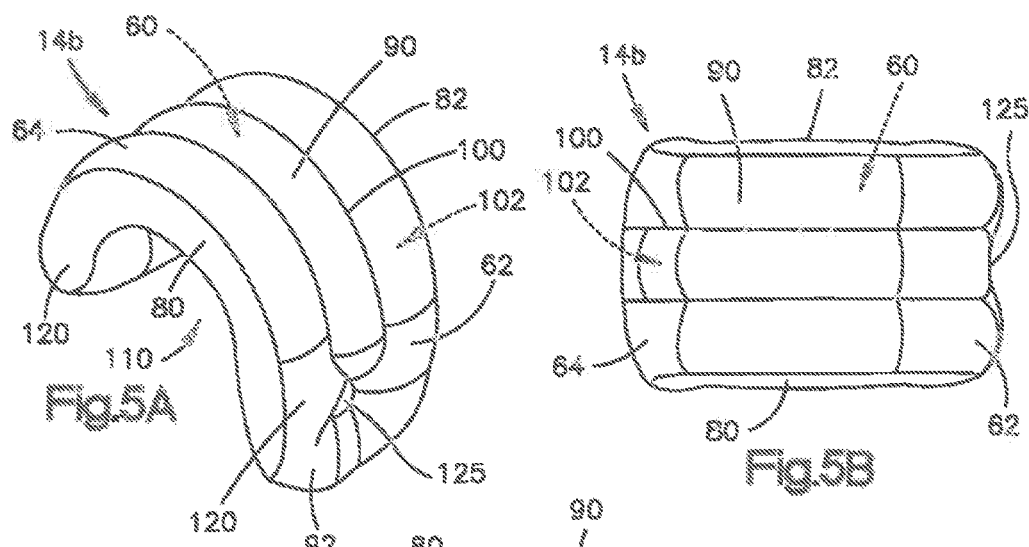
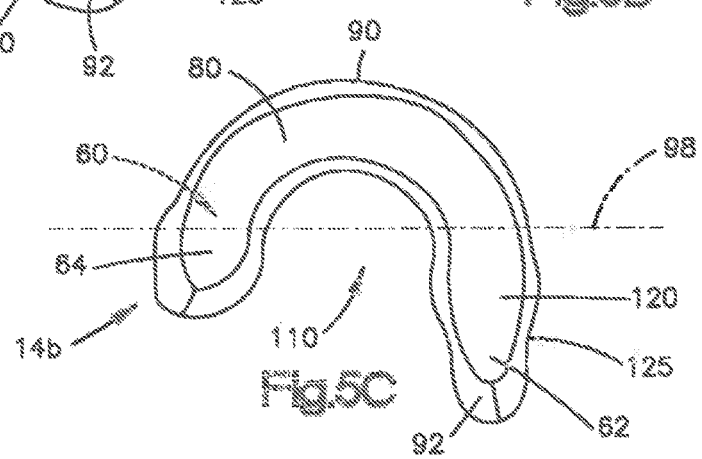

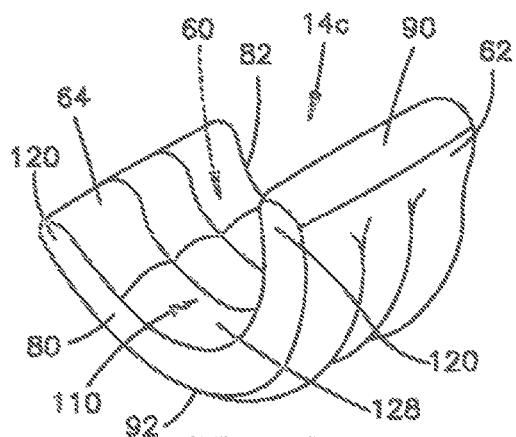
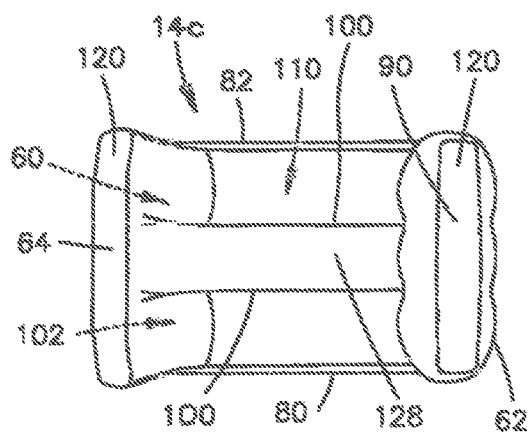
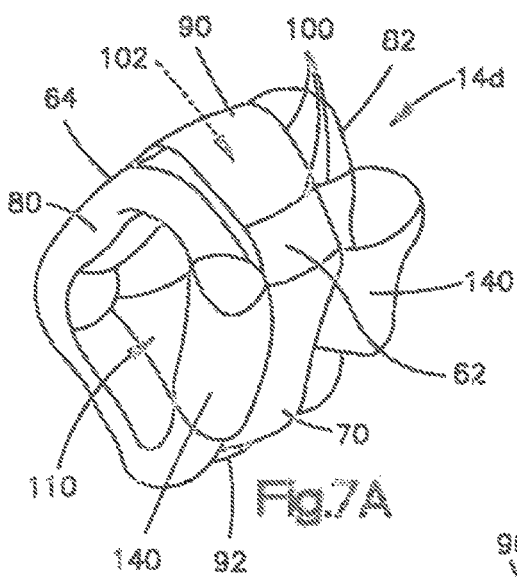
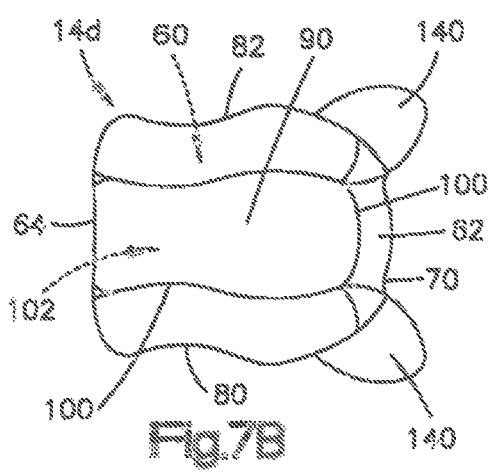
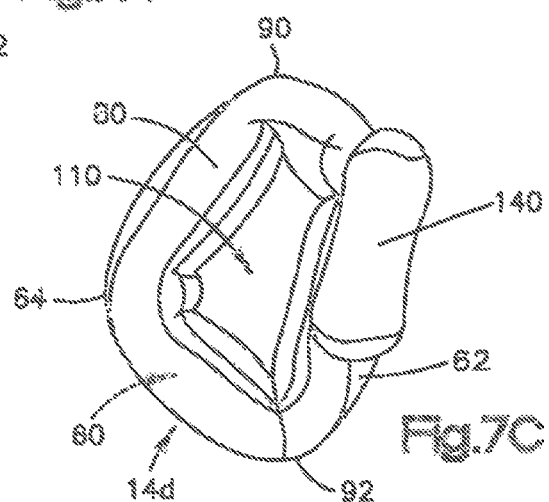

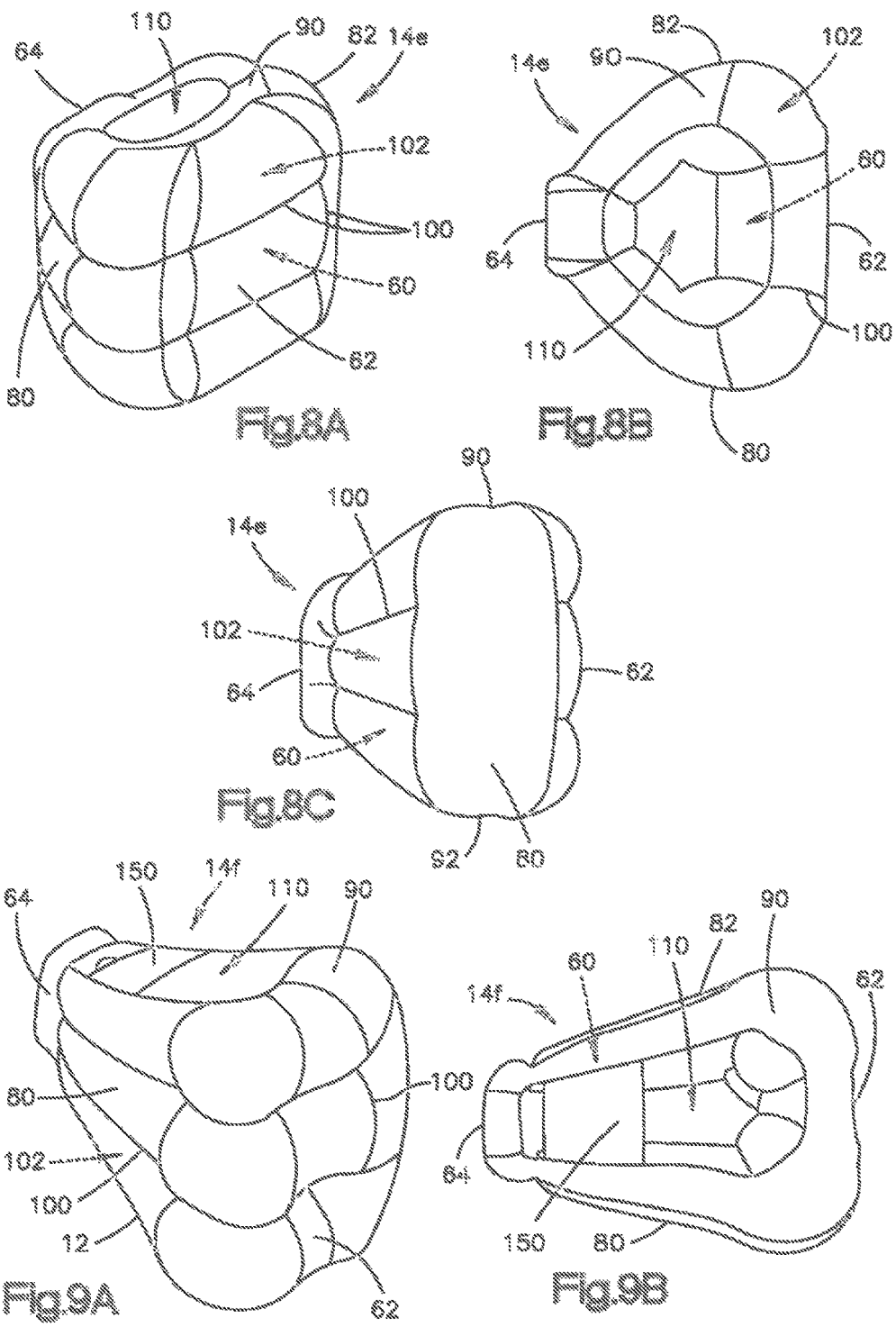

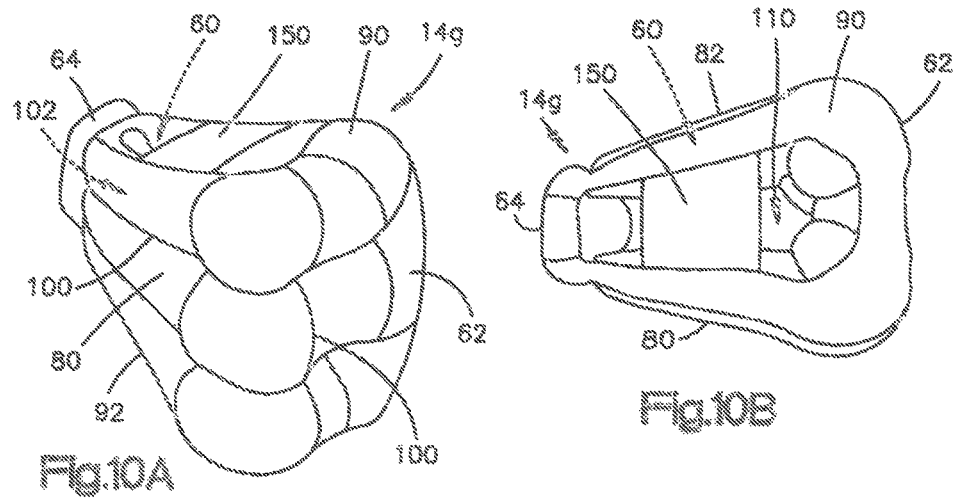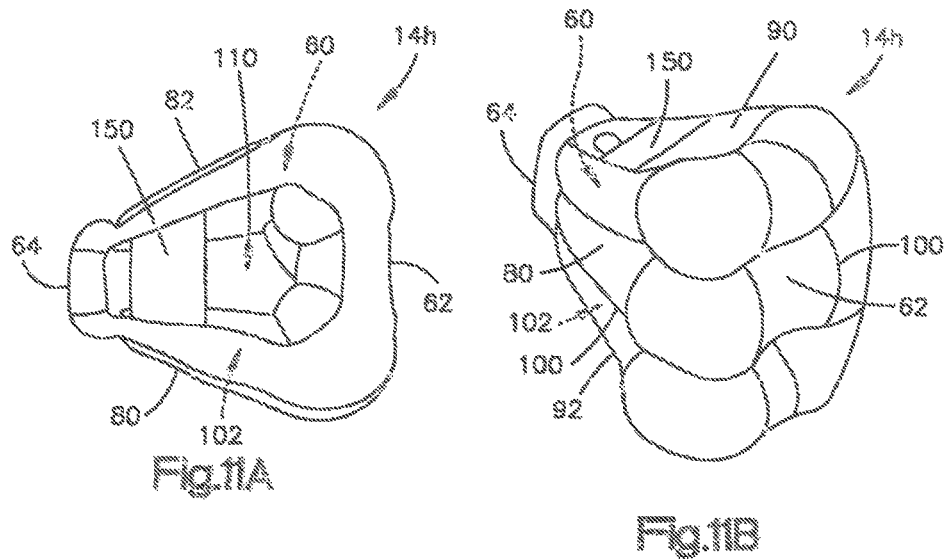

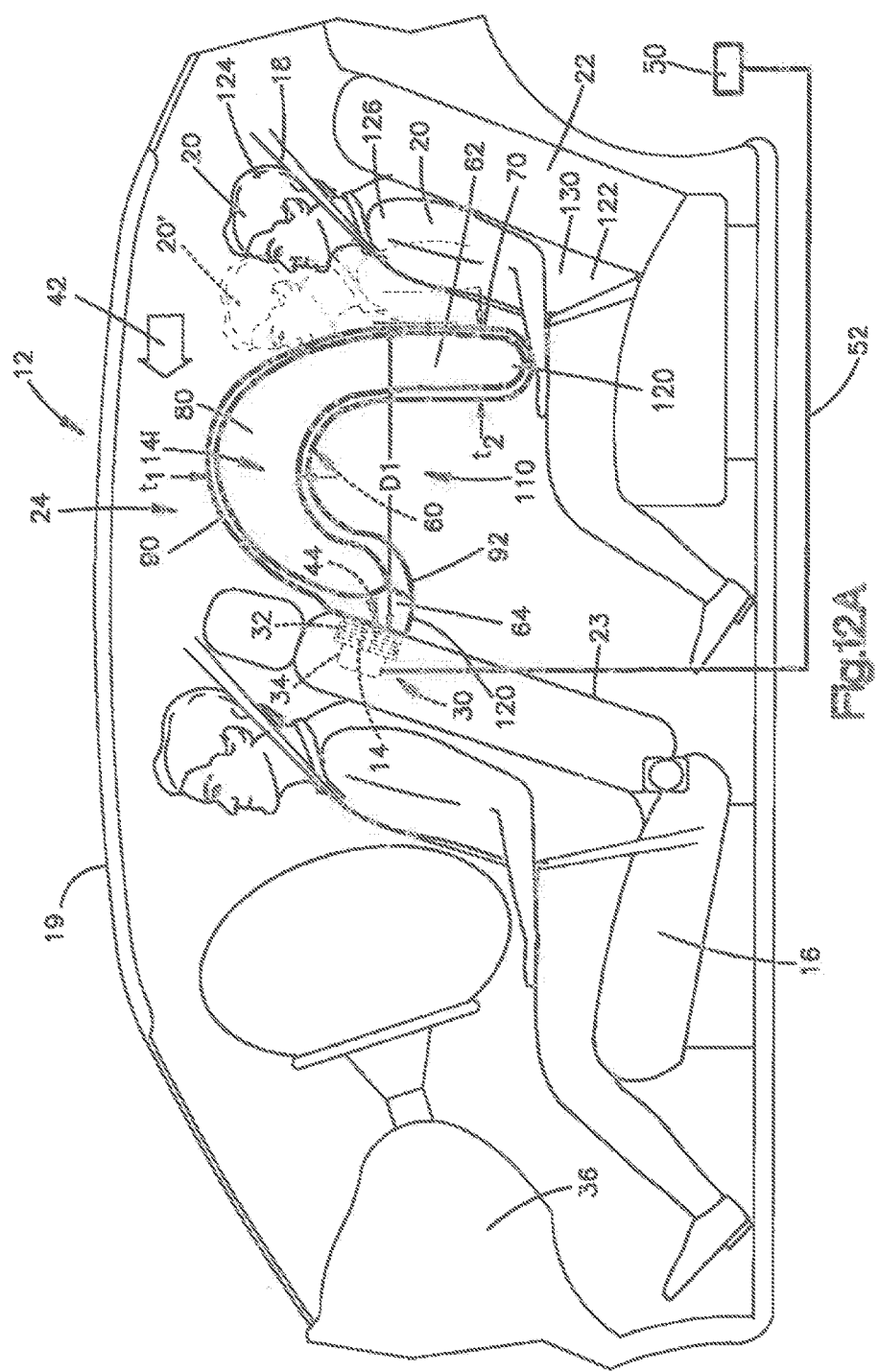

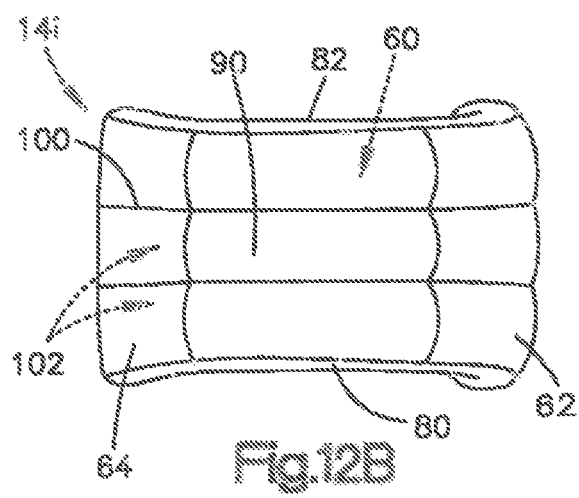

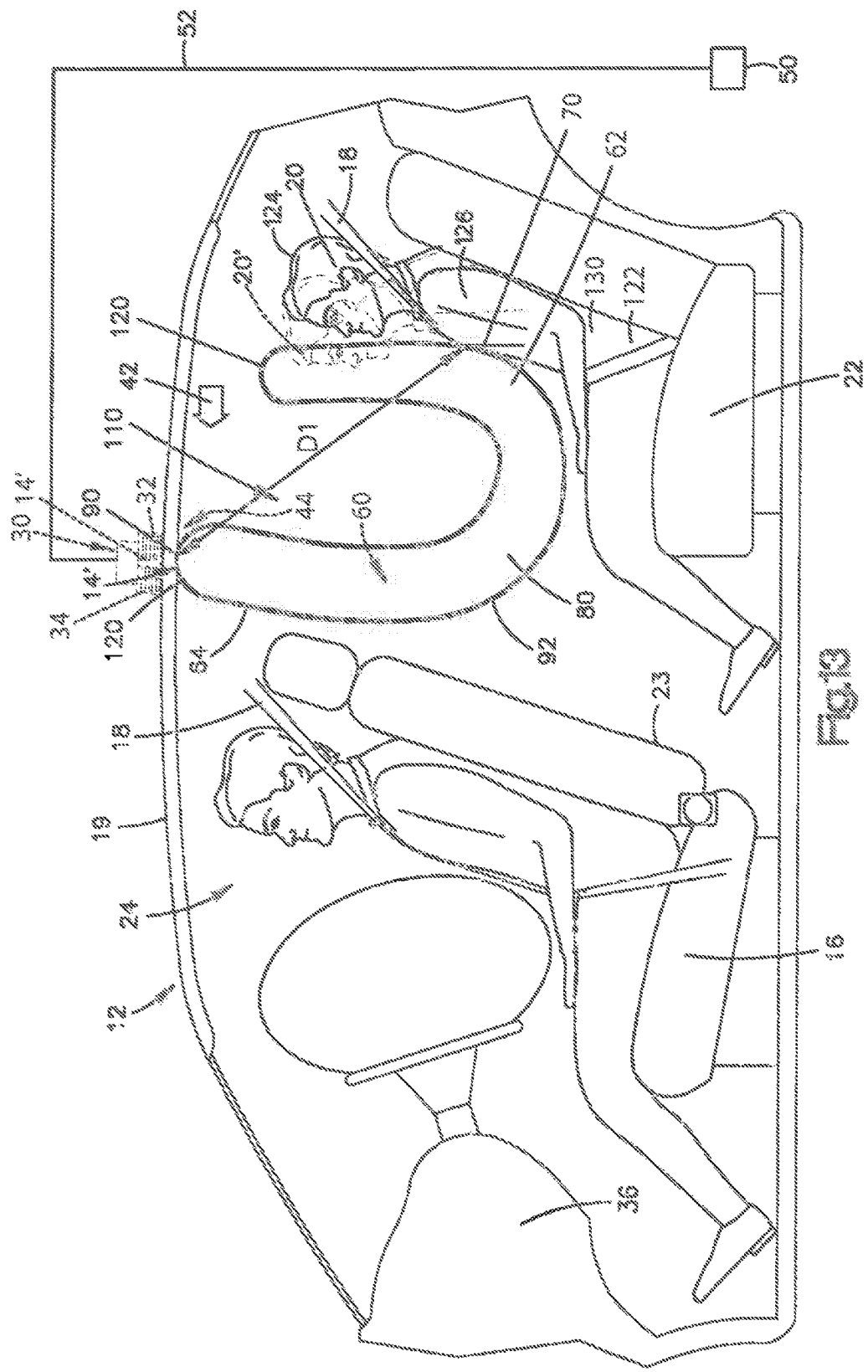

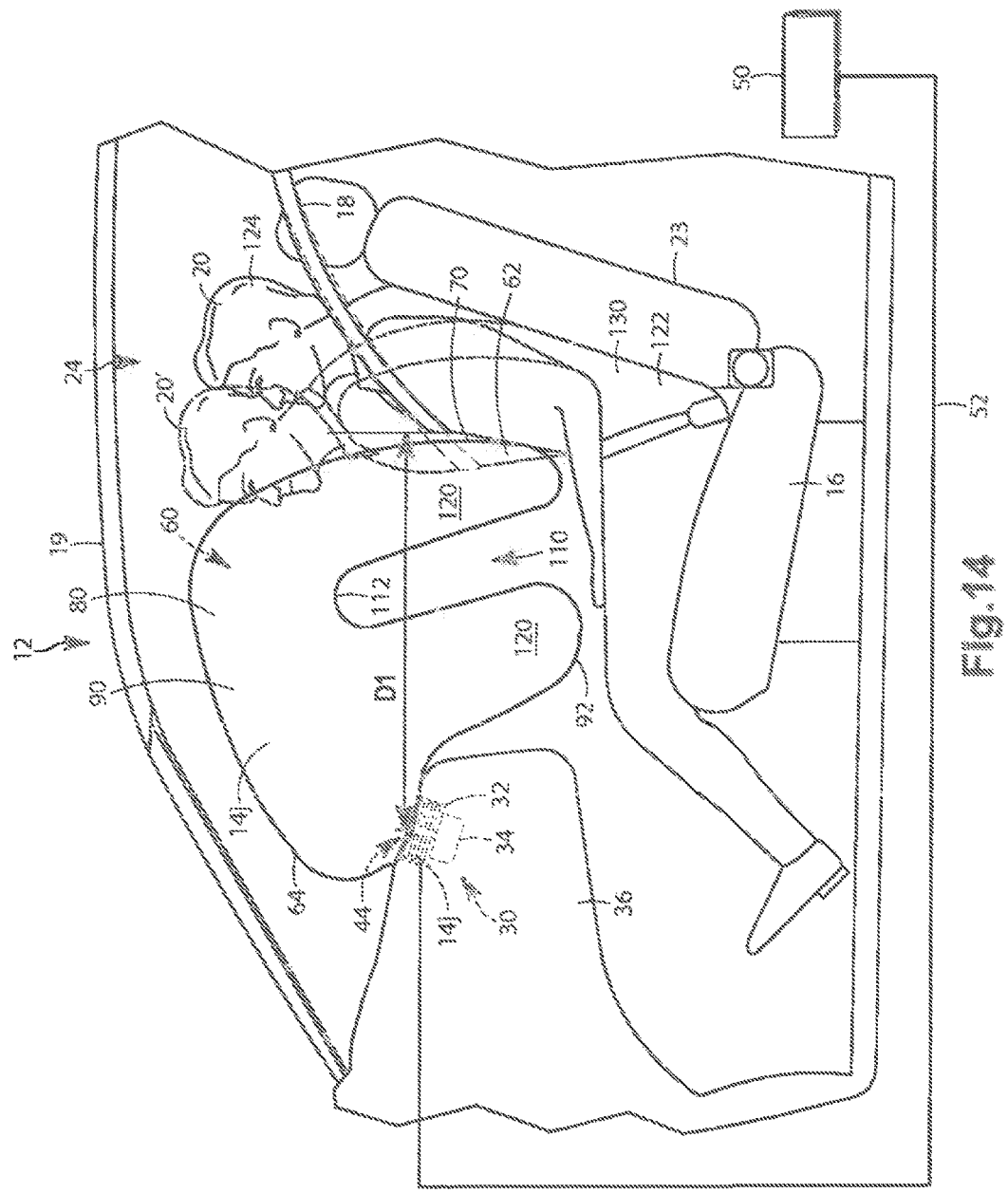

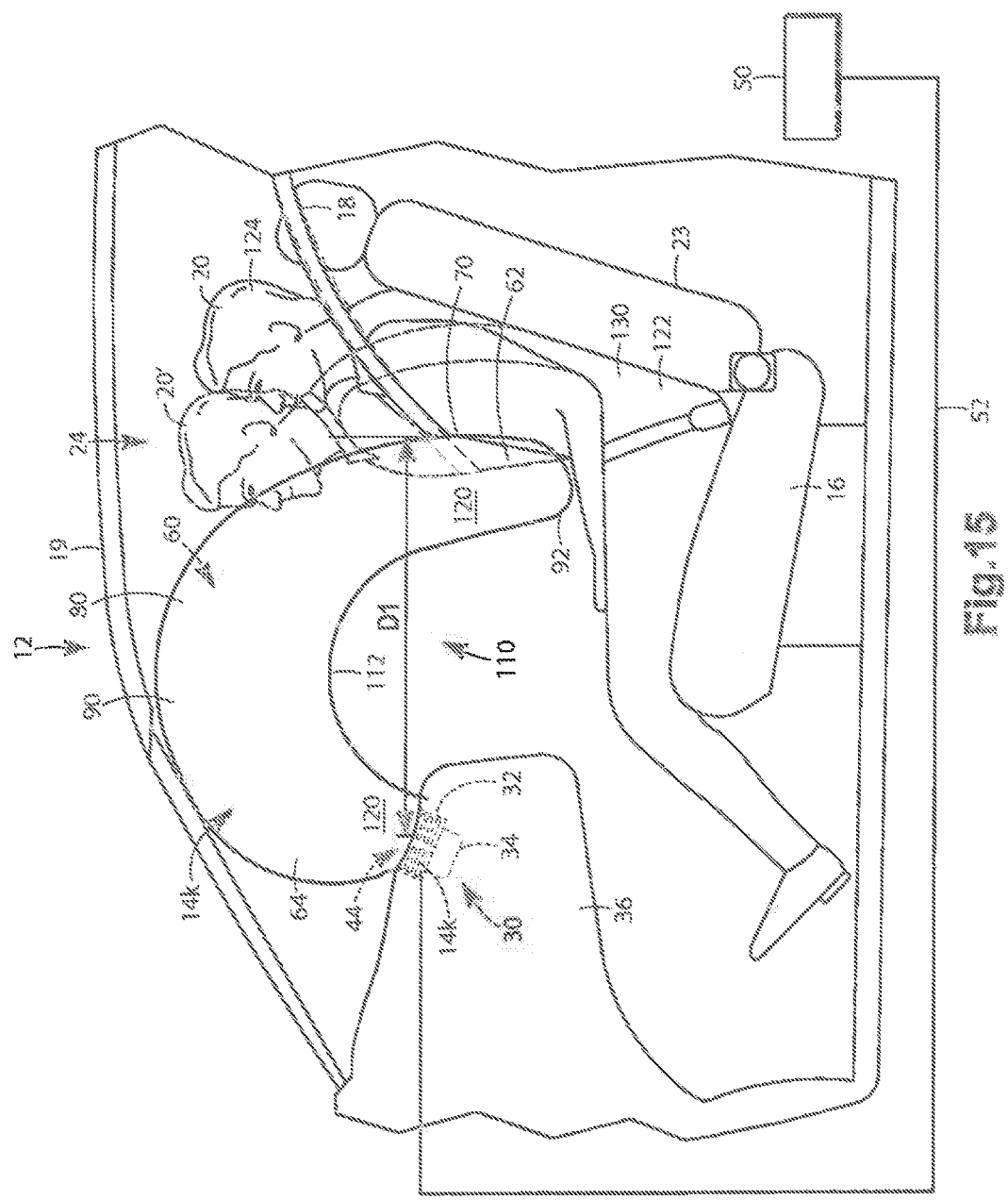

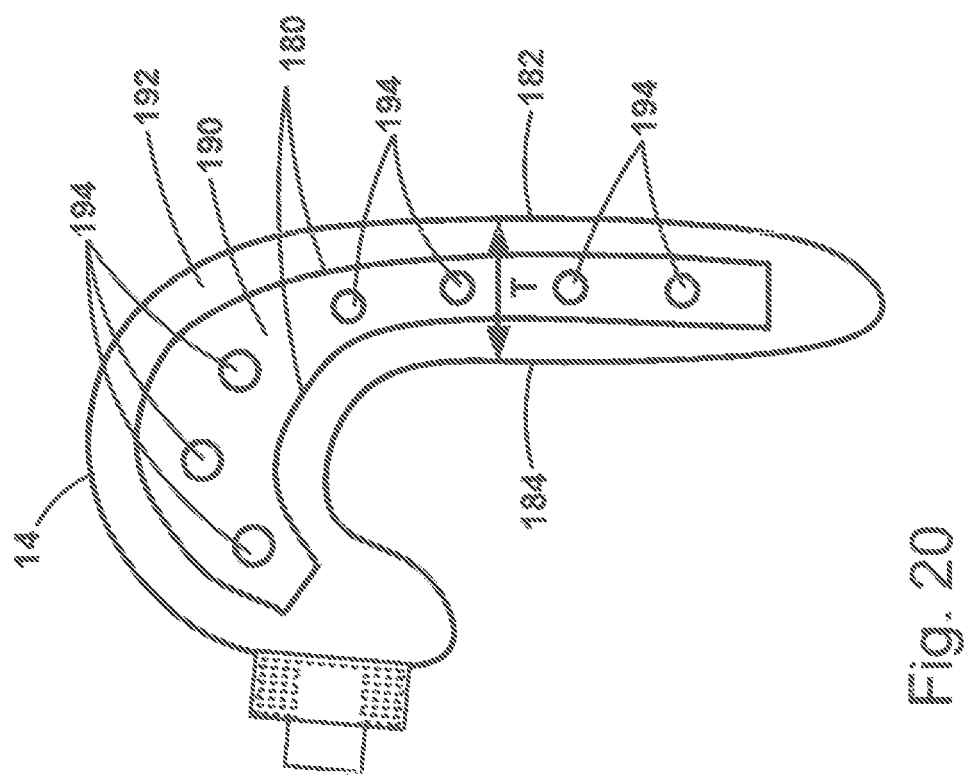

SELF-CONFORMING REARSEAT AIR BAG

RELATED APPLICATIONS

This application is a continuation in part of U.S. application Ser. No. 15/629,833, filed Jun. 22, 2017, which is a divisional of U.S. application Ser. No. 14/583,856, filed Dec. 29, 2014, which claims the benefit of U.S. Provisional Application Ser. No. 62/066,605, filed Oct. 21, 2014 and U.S. Provisional Application Ser. No. 62/067,075, filed Oct. 22, 2014, the entirety of which are incorporated herein by reference.

FIELD OF THE INVENTION

The present invention relates to an apparatus for helping to protect an occupant of a vehicle. More particularly, the present invention relates to an air bag inflatable between a reaction surface of a vehicle and an occupant in a vehicle seat.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags can be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result of forces exerted on the door by the inflating air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated position. The air bag cover opens as a result of forces exerted on the cover by the inflating driver air bag.

Another type of air bag is a side impact air bag inflatable between a side structure of a vehicle and a vehicle occupant. Side impact air bags may, for example, be seat mounted, side structure mounted, or door mounted. Another type of air bag is an inflatable knee bolster inflatable between an instrument panel and/or steering column of a vehicle and a vehicle occupant. Inflatable knee bolsters may, for example, be mounted in the instrument panel or on the steering column.

Passenger side and frontal air bags are typically designed to extend to a height within the vehicle that provides a barrier between the head of a taller vehicle occupant and a windshield of the vehicle. This air bag height adds volume to the air bag and places a portion of the air bag volume above the shoulders of a shorter occupant. There is a need in the art for an air bag construction that reduces the volume of the air bag above the shoulders of taller and shorter occupants.

SUMMARY OF THE INVENTION

The present invention relates to an apparatus for helping to protect an occupant of a vehicle having seat for receiving the vehicle occupant. The apparatus includes an inflatable vehicle occupant protection device inflatable from a stored condition in the vehicle adjacent a reaction surface to a deployed condition between the reaction surface and the vehicle occupant. The protection device includes a front portion presented toward the seat and an inflatable volume for receiving a penetrating occupant when the protection device is in the deployed condition. A rear portion connected to the front portion has an inflatable volume spaced from the front portion by a space. The front portion is positioned between the vehicle occupant and the rear portion when the protection device is in the deployed condition. The inflated front portion is movable in a fore-aft direction relative to the rear portion to engage the vehicle occupant regardless of the distance between the reaction surface and the vehicle occupant.

In accordance with another embodiment an apparatus for helping to protect an occupant of a vehicle having a seat for receiving the vehicle occupant includes an inflatable vehicle occupant protection device inflatable from a stored condition in the vehicle adjacent a reaction surface to a deployed condition between the reaction surface and the vehicle occupant. The protection device includes a front portion presented toward the seat and an inflatable volume for receiving a penetrating occupant when the protection device is in the deployed condition. The front portion has a substantially constant thickness in the fore-aft direction to a lowermost edge of the front portion. A rear portion connected to the front portion has an inflatable volume spaced from the front portion by a space. The front portion is positioned between the vehicle occupant and the rear portion when the protection device is in the deployed condition. The inflated front portion is movable in a fore-aft direction relative to the rear portion to engage the vehicle occupant regardless of the distance between the reaction surface and the vehicle occupant.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic illustration of an apparatus for helping to protect an occupant of a vehicle in accordance with an embodiment of the present invention;

FIG. 2 is a schematic side view of the apparatus of FIG. 1 illustrating different conditions with a belted vehicle occupant;

FIGS. 4A-4B are schematic illustrations of an apparatus for helping to protect an occupant of a vehicle in accordance with another embodiment of the present invention;

FIGS. 5A-5C are schematic illustrations of an apparatus for helping to protect an occupant of a vehicle in accordance with another embodiment of the present invention;

FIGS. 6A-6B are schematic illustrations of an apparatus for helping to protect an occupant of a vehicle in accordance with another embodiment of the present invention;

FIGS. 7A-7C are schematic illustrations of an apparatus for helping to protect an occupant of a vehicle in accordance with another embodiment of the present invention;

FIGS. 8A-8C are schematic illustrations of an apparatus for helping to protect an occupant of a vehicle in accordance with another embodiment of the present invention;

FIGS. 9A-9B are schematic illustrations of an apparatus for helping to protect an occupant of a vehicle in accordance with another embodiment of the present invention;

FIGS. 10A-10B are schematic illustrations of an apparatus for helping to protect an occupant of a vehicle in accordance with another embodiment of the present invention;

FIGS. 11A-11B are schematic illustrations of an apparatus for helping to protect an occupant of a vehicle in accordance with another embodiment of the present invention;

FIGS. 12A-12B are schematic illustrations of an apparatus for helping to protect an occupant of a vehicle in accordance with another embodiment of the present invention; and FIG. 13 is a schematic illustration of an apparatus for helping to protect an occupant of a vehicle in accordance with another embodiment of the present invention.

FIG. 14 is a schematic illustration of an apparatus for helping to protect an occupant of a vehicle in accordance with another embodiment of the present invention.

FIG. 15 is a schematic illustration of an apparatus for helping to protect an occupant of a vehicle in accordance with another embodiment of the present invention.

FIG. 20 illustrates schematically feature that can be implemented with the apparatus as shown in any of the embodiments disclosed herein.

DETAILED DESCRIPTION OF THE INVENTION

Figure 3A:
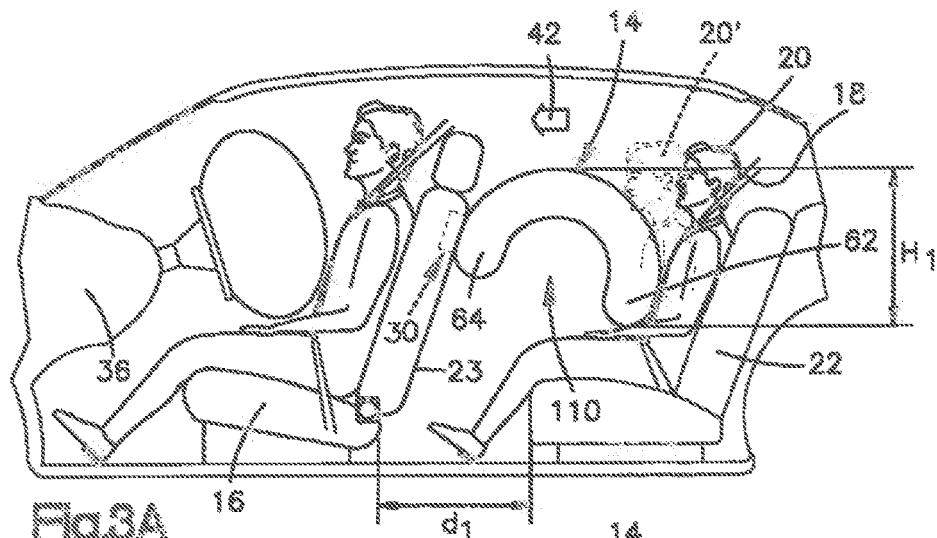
FIGS. 3A-3C are schematic side views of the apparatus of FIG. 1 illustrating different rear seat conditions with a belted vehicle occupant.

The present invention relates to an apparatus for helping to protect an occupant of a vehicle. More particularly, the present invention relates to an air bag inflatable between a reaction surface of a vehicle and an occupant in a vehicle seat. An apparatus 10 for helping to protect an occupant 20 of a vehicle 12 includes an inflatable vehicle occupant protection device 14 in the form of an air bag 14. In the embodiment illustrated in FIGS. 1-4C, the air bag 14 is a passenger air bag for helping to protect an occupant 20 of a rear seat 22 on a side 24 of the vehicle 12 behind a front seat 16 of the vehicle. The front seat 16 is positioned behind and presented towards an instrument panel 36. The side 24 can be the driver side (as shown) or the passenger side (not shown) of the vehicle 12. The vehicle 12 also includes a roof 19 and a seatbelt 18 connected to the rear seat 22 for helping to protect the vehicle occupant 20.

Referring to FIG. 2, the air bag 14 can be part of an air bag 14 module 30 that includes an inflator 32 and a housing 34. The air bag 14 has a stored condition, indicated by dashed lines in FIG. 2, in which the air bag is folded and placed in a stored condition within the housing 34. The module 30 is mounted to or within a seat back 23 of the front seat 16 of the vehicle 12. The housing 34 helps contain and support the air bag 14 and inflator 32 in the seat back 23. Alternatively, the module 30 can be mounted in the B-pillar, door, rear seat cushion, center console, instrument panel 36 or roof 19 of the vehicle 12 (not shown).

A module 30 door (not shown) can be releasably connected to the seat back 23 and/or the housing 34. In a closed condition (not shown), the door forms a cover for the module 30 and helps enclose the air bag 14 in the stored condition in the housing 34 within the seat back 23. The door is movable to an opened condition that uncovers an opening 44 in the housing 34 and seat back 23 through which the air bag 14 can be deployed from the stored condition in the housing 34 to an inflated or deployed condition. The door can be connected to the vehicle 12, e.g., connected to the seat back 23, either directly or through the housing 34, by means (not shown), such as a plastic hinge portion, a strap or a tether.

The inflator 32 is actuatable to provide inflation fluid to an inflatable volume 60 of the air bag 14 to deploy the air bag 14 to the inflated condition. The inflator 32 can be of any known type, such as stored gas, solid propellant, augmented or hybrid. The apparatus 10 includes a sensor, illustrated schematically at 50, for sensing an event for which inflation of the air bag 14 is desired, such as a collision. The inflator 32 is operatively connected to the sensor 50 via lead wires 52.

The air bag 14 can be constructed of any suitable material, such as nylon (e.g., woven nylon 6-6 yarns), and can be constructed in any suitable manner. For example, the air bag 14 can include one or more pieces or panels of material. If more than one piece or panel is used, the pieces or panels can be interconnected by known means, such as stitching, ultrasonic welding, heat bonding or adhesives, to form the air bag 14. The air bag 14 can be uncoated, coated with a material, such as a gas impermeable urethane or laminated with a material, such as a gas impermeable film. The air bag 14 thus can have a gas-tight or substantially gas-tight construction. Those skilled in the art will appreciate that alternative materials, such as polyester yarn, and alternatives coatings, such as silicone, can also be used to construct the air bag 14.

In the illustrated embodiment, the air bag 14 is constructed of one or more panels of material interconnected to define the inflatable volume 60 of the air bag having the configuration illustrated in FIGS. 1-4C. Referring to FIGS. 1-2, the inflated air bag 14 deploys from the housing 34 away from the seat back 23 in an aft direction toward the occupant 20 in the rear seat 22. The seat back 23 therefore acts as a reaction surface of the vehicle 12 for the deploying air bag 14. The air bag 14 has an inverted U-shape configuration when viewed from the side and a generally rectangular shape when viewed from the top (not shown). The inflated air bag 14 includes a front portion 62 adjacent the occupant 20 and a rear portion 64 adjacent the seat back 23.

In the deployed condition, the front portion 62 is spaced from the front seat 16 and includes a front panel or surface 70 presented towards the occupant 20 in the rear seat 22. The rear portion 64 is positioned adjacent and connected to the seat back 23 via its connection to the module 34. The surface 70 is spaced from the seat back 23 by a distance or depth D1 extending in a fore-aft direction of the vehicle 12. Lateral portions 80, 82 extend between the front portion 62 and the rear portion 64. The lateral portions 80, 82 extend substantially parallel to one another on opposite sides of the air bag 14. The lateral portion 80 is positioned outboard in the vehicle 12 and the lateral portion 82 is positioned inboard in the vehicle.

A top portion 90 is presented toward the vehicle roof 19 and connects the front portion 62 to the rear portion 64. A bottom portion 92 is positioned nearer the rear seat 22. The front portion 62, rear portion 64, lateral portions 80, 82, top portion 90, and bottom portion 92 cooperate with one another to help define the inflatable volume 60 of the air bag 14. Each of the front portion 62, the rear portion 64, the lateral portions 80, 82, the top portion 90, and the bottom portion 92 can include non-inflatable portions (not shown) in addition to their respective inflatable portions.

One or more seams 100 can extend generally in the fore-aft direction along the length of the air bag 14 from the front portion 62 to the rear portion 64 for separating the inflatable volume 60 into a plurality of chambers 102. The depth of each seam 100 into the inflatable volume 60 can be tailored to form a chamber 102 having a desired cross-section and/or pressurization, i.e., the seams can be the same or can be different from one another such that the chambers inflate and pressurize at different rates. The seams 100 can also be configured to control the volume(s) of the chambers 102 to thereby control the size of the inflator 32 needed to fully inflate and deploy the air bag 14. Controlling the volume(s) of the chambers 102 also controls the stiffness of the air bag 14 to meet desired performance criterion. In one example, the middle chamber(s) 102 in the inboard-outboard direction can be made smaller to thereby provide a reduced stiffness relative to the stiffness of the more inboard and more outboard chambers.

The air bag 14 includes a space 110 defining an uninflated or unpressurized volume outside the inflatable volume 60. In the construction shown in FIG. 1, the space 110 extends from the bottom portion 92 towards the top portion 90. The space 110 extends entirely between the lateral portions 80, 82 and terminates at an inner surface 112 of the top portion 90. Consequently, the air bag 14 is bifurcated into two inflatable lobes 120 spaced apart from one another at the bottom portion 92 and connected to one another by the top portion 90 to help define the shape of the space 110. Each of the lobes 120 has substantially the same height in the vertical direction such that the air bag 14 is substantially symmetric about the top portion 90. The air bag 14 shown in FIG. 1 therefore has the shape of an arch or upside-down U.

A midline 98 extends through the air bag 14 in the fore-aft direction of the vehicle 12. The midline 98 is spaced equidistantly from the uppermost edge and the lowermost edge of the air bag 14, i.e., the midline is positioned halfway along the air bag height, indicated generally at $H_1$. In the embodiment of FIG. 1, the size of the front portion 62, top portion 90, and rear portion 64 are chosen such that the space 110 extends above the midline 98, i.e., the space has a depth from the lowermost edge of the air bag 14 that is greater than half of the height $H_1$ of the inflated air bag 14. Alternatively, the space 110 can have a depth that is half or less than half of the height $H_1$ of the air bag 14 (not shown). The presence of the space 110 in the air bag 14 reduces the size of the inflatable volume 60 in order to provide desirable inflation performance criterion.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 60 of the air bag 14 in a known manner. The inflating air bag 14 exerts a force on the seat back 23 of the front seat 16 to rupture the seat back and allow the air bag to inflate from the stored condition to the deployed condition, such as the fully inflated, deployed, and pressurized condition illustrated in solid lines in FIG. 2. The air bag 14, when deployed, helps protect the vehicle occupant 20 from impacts with parts of the vehicle 12, such as impacts with the front seat 16.

The air bag 14, when deployed, helps protect the occupant 20 by helping to absorb the force of impact placed on the air bag by the occupant. Referring to FIG. 2, when the occupant 20 impacts the air bag 14, the occupant penetrates the air bag, which absorbs and distributes the impact forces throughout the area and volume of the air bag. By "penetrates" into the air bag 14, it is meant to refer to the instance where, in the case of a frontal impact to the vehicle 12, the occupant 20 is moved forward, as indicated by the arrow labeled 42 and the dashed lines labeled 20' in FIG. 2, into engagement with the air bag. The "penetration" of the occupant 20 into the air bag 14 is the distance or degree to which the occupant moves into the inflated depth of the air bag relative to the point at which the occupant first engages the inflated air bag, i.e., engages the surface 70 of the front portion 62.

In other words, the degree of penetration could be measured as the distance a given point on the surface 70 is moved toward the front seat 16 by the penetrating occupant 20'. For example, the degree of penetration in FIG. 2 can be calculated as the difference between the fully inflated depth D1 of the entire air bag 14 and the penetrated depth of the entire air bag (not shown) relative to the seat back 23. Alternatively, penetration could be measured as the change in distance between a point on the surface 70 and a fixed point on the front seat 16 facing the occupant or between a point on the occupant 20, e.g., the occupant's chest, and a fixed point on the seat back 23 starting when the occupant first contacts the air bag 14 (not shown).

Several factors determine the degree to which an occupant 20 penetrates the air bag 14. For example, the size or mass of the occupant 20, the speed at which the occupant strikes the air bag 14, and the pressurization of the air bag all help determine the degree to which the occupant penetrates the air bag in a given deployment scenario.

As shown in FIG. 2, in the case of a belted occupant 20, the seatbelt 18 serves to help restrain the occupant. As a result, the belted occupant 20, especially the occupant's lower torso 122 and hips 130, is restrained from moving toward the front seat 16. This allows the air bag 14 to inflate and deploy with comparatively little resistance or inhibition from the occupant 20. As shown in dashed lines at 20', the belted occupant's head 124 penetrates the front portion 62 of the air bag 14 and, more specifically, penetrates the surface 70 of the air bag near the top portion 90. The belted occupant's head 124 can also penetrate the top portion 90 of the air bag 14, depending on the size of the occupant and/or the height $H_1$ of the air bag. The belted occupant's upper torso 126 penetrates the bottom portion 92 of the air bag 14 at the front lobe 120.

Due to the configuration of the air bag 14, the front portion 62 is deflected by the penetrating occupant 20 in a direction towards the front seat 16 and, thus, the front portion is deflected towards the rear portion 64 of the air bag. Since the space 110 is unpressurized and positioned between the front portion 62 and the rear portion 64, the front portion is deflected into the space and closer to the rear portion. The degree or distance to which the occupant 20' penetrates the air bag 14 can be comparatively or relatively small. The air bag 14 can be configured such that the front portion 62 remains spaced from the rear portion 64 throughout full penetration of the belted occupant 20 into the front portion. To this end, the stiffness of the air bag 14 can be tailored to ensure the volume of the space 110 does not completely disappear when the occupant 20 penetrates the air bag.

Due to the space 110 between the front and rear portions 62, 64, the restraint forces provided by the lower portions of the air bag 14 are less (softer) than the restraint forces provided by the upper portions because the front portion can deflect into the space in a pivotal or sliding fashion via the joining region to the top portion 90. In other words, since the space 110 is not pressurized as it would be in an air bag 14 volume that is continuous throughout the entire depth D1 the size of the inflatable volume 60 the occupant 20 interacts with is reduced and, thus, restraint by the lower portions of the air bag 14 is initially softer relative to a continuous bag design. If the occupant 20 penetrates the air bag 14 sufficient to cause the front portion 62 to contact the rear portion 64, then the restraint by the contacted portions will become stiffer such that engagement of the penetrating occupant 20' with the front seat can be avoided.

In contrast, the top portion 90 of the air bag 14 extends substantially continuously from the back of the front seat 16 to the occupant 20 with little or no open space. The top portion 90 therefore provides a stiffer restraint to the penetrating occupant's head 124 and upper torso 126 relative to the restraint provided by the lobe 120 to the occupants lower torso 122. The air bag 14 of the present invention is therefore advantageous in providing variable restraint to the penetrating occupant 20' in order to meet desirable performance criterion.

Furthermore, due to the vertical configuration of the seams 100, each chamber 102 provides substantially similar restraint along the front portion 62 between its lowermost edge and uppermost edge. Consequently, occupants 20 having different head positions or heights experience similar restraint, regardless of where the head 124 strikes along the height of the front portion 62. The height of each chamber 102 on the front portion 62 can therefore be configured to correspond with the range of possible occupant head 124 locations based upon the expected size(s) of occupants 20 in the rear seat 22.

If the belted occupant 20 penetrate into the air bag 14 sufficient to cause the front portion 62 to engage the rear portion 64, i.e., the space 110 between the front portion and the rear portion substantially or entirely disappears, the air bag of the present invention produces substantially the same occupant restraint as two smaller volume air bags positioned adjacent and abutting one another in the fore-aft direction. In other words, such a dual air bag configuration would result in substantially the same homogenous occupant 20 restraint as the single volume air bag 14 of the present invention provided with the unpressurized space 110.

Engagement of the front portion 62 with the rear portion 64 occurs with larger occupants 20 and/or in higher speed crash events. Consequently, this resulting stiffening of restraint during the later stages of a crash event is advantageous for reducing the possibility of occupant-to-front seat 16 contact. The space 110 of the present invention advantageously allows the air bag 14 to provide variable occupant 20 restraint by region, i.e., head 124 vs. torso 122, 126, as well as restraint that varies, i.e., stiffens, if and when the head 124 and upper torso get close enough to the front seat 16 that the space collapses to at or near zero volume.

The low volume configuration of the air bag 14 also facilitates earlier initiation of restraint since the reduced volume air bag 14 can be positioned and filled more rapidly compared to a continuous volume air bag. There is also the potential to reduce the required size and cost of the inflator 32.

The inflator 32, top portion 90, front portion 62, and the space 110 of the air bag 14 are sized to provide a volume of inflation fluid sufficient to inflate, deploy, and pressurize the air bag to the inflated condition of FIG. 2 within desired performance parameters. Since the belted occupant 20 is the expected condition, the top portion 90, front portion 62, and space 110 configurations of FIG. 2 help bolster the reliability of the apparatus.

Furthermore, those having ordinary skill appreciate that the low volume construction of the air bag 14 of the present invention can allow the air bag to be free of active or adaptive venting while still providing variable restraint for the penetrating occupant 20'. The low volume construction of the air bag 14 of the present invention also allows the height of the front portion 62 of the air bag to be increased sufficient to engage the roof 19 to accommodate taller occupants without compromising the ability of the air bag to provide variable occupant restraint.

Figure 3B:
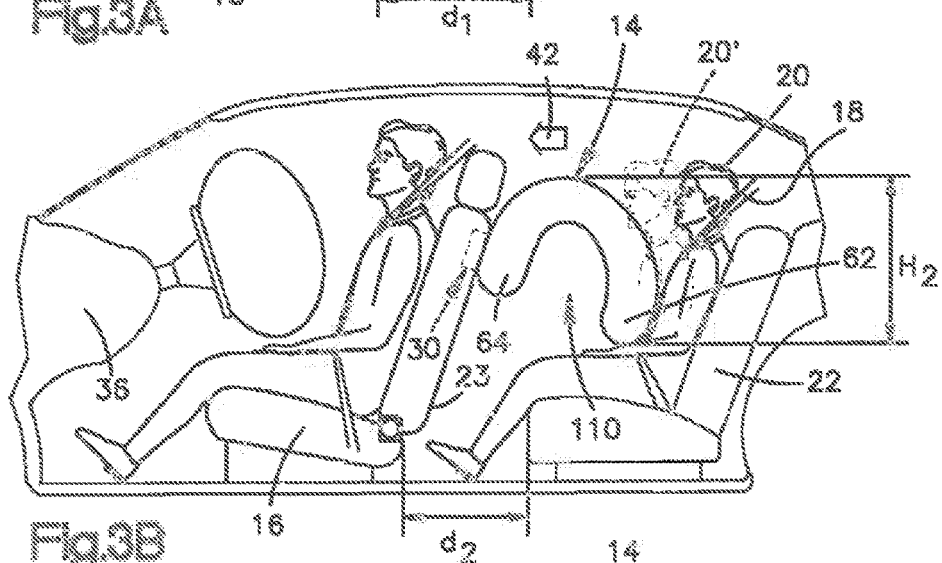
Figure 3C:
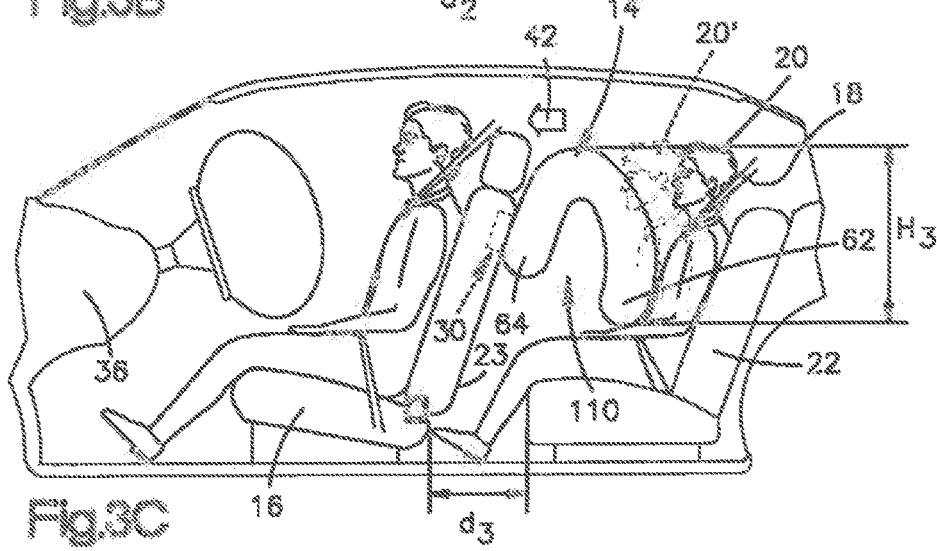

Referring to FIGS. 3A-3C, the construction of the air bag 14 of the present invention is adapted to advantageously conform to various positions of the front seat 16 and/or rear seat 22 to enable the air bag to help protect the occupant 20 of the rear seat based on various front seat conditions. In other words, the air bag 14 of the present invention is operable to help provide similar restraint to the occupant 20 as the distance in the fore-aft direction between the front seat 16 and rear seat 22 varies. The space 110 between the front portion 62 and rear portion 64 of the air bag 14 allows the inflated air bag to exhibit the same general arch shape regardless of the fore-aft distance between the front seat 16 and the rear seat 22.

As the fore-aft distance between the front seat 16 and the rear seat 22 increases (thereby moving the occupant 20 further from the front seat), the front portion 62 inflates and deploys further away from the rear portion 64 fixed to the front seat. As a result, the size of the space 110 in the fore-aft direction increases, thereby decreasing the height $H_1$ of the air bag 14. Similarly, as the fore-aft distance between the front seat 16 and the rear seat 22 decreases (thereby moving the occupant 20 closer to the front seat), the front portion 62 deploys closer to the rear portion 64 fixed to the front seat. As a result, the size of the space 110 in the fore-aft direction decreases, thereby increasing the height $H_1$ of the air bag 14. In other words, the arch shaped configuration of the air bag 14 of the present invention expands or collapses to conform to different spatial relationships between the front and rear seats 16, 22.

The air bag 14 operates in substantially the same manner regardless of the fore-aft spacing between the front and rear seats 16, 22. The seat back 23 acts as the primary reaction surface against forward movement of the air bag 14 due to deployment and the penetrating occupant 20'. Consequently, in each case the front portion 62 is fully inflated before it engages the occupant 20 and remains fully inflated during movement towards the occupant and upon engagement with the occupant. The penetrating occupant 20' then causes the front portion 62 to move toward the rear portion 64 while providing restraint to the occupant, which increases once the front and rear portions abut one another to stiffen the air bag 14 as described.

FIG. 3A illustrates the occupant 20 in the rear seat 22 spaced a first distance $d_1$ from the front seat 16. This can occur, for example, when the front seat 16 is moved away from the rear seat 22 and towards the instrument panel 36 to accommodate a smaller or shorter front seat occupant 20. In this condition, the fore-aft depth of the air bag 14 is equal to the distance $d_1$, with the air bag in an expanded arch shape. The air bag 14 in FIG. 3A has the height $H_1$.

FIG. 3B illustrates an occupant 20 in the rear seat 22 spaced a second distance $d_2$ from the front seat 16 less than the first distance $d_1$. This can occur, for example, when the front seat 16 is moved a distance from the instrument panel 36 to accommodate a normally sized, front seat occupant 20. In this condition, the fore-aft depth of the air bag 14 is equal to the distance $d_2$ and, thus, the arched air bag 14 in FIG. 3B is condensed in the fore-aft direction relative to the air bag 14 in FIG. 3A. Consequently, the air bag 14 in FIG. 3B has a height $H_2$ greater than the height $H_1$.

FIG. 3C illustrates an occupant 20 in the rear seat 22 spaced a third distance $d_3$ from the front seat 16 less than the second distance $d_2$. This can occur, for example, when the front seat 16 is moved toward the rear seat 22 and away from the instrument panel 36 to accommodate a larger or taller front seat occupant 20. In this condition, the fore-aft depth of the air bag 14 is equal to the distance $d_3$ and, thus, the arched air bag in FIG. 3C is condensed in the fore-aft direction relative to the air bags in FIGS. 3A and 3B. Consequently, the air bag 14 in FIG. 3C has a height $H_3$ greater than the height $H_2$.

During deployment of the air bag 14 in any of the seat conditions of FIG. 3A-3C, the inflated front portion 62 moves away from the rear portion 64 and toward the rear seat 22 until the surface 70 abuts the occupant 20. At this point the front portion 62 is folly inflated and the occupant is not penetrating the air bag 14. The occupant 20 can thereafter interact with the deployed air bag 14 in the manner previously described.

Conventional air bags have only one inflation depth in the fore-aft direction when the air bag is allowed to fully deploy, i.e., when the occupant does not penetrate the air bag. In other words, once the occupant is spaced beyond a predetermined distance from the front seat the conventional air bag fully inflates to the same inflation depth, leaving a gap between the deployed air bag and the occupant. This gap is problematic in that it allows the occupant to gain speed while moving towards the air bag before engaging the same, thereby unnecessarily increasing the degree of restraint needed from the air bag. In other words, these conventional air bags provide delayed restraint of the occupant during the time the occupant moves through the gap into engagement with the air bag. As a result, not only can the occupant gain speed during this time, but the occupant can also move inboard or outboard, causing the occupant to strike the air bag in a less than optimal manner.

On the other hand, the air bag 14 of the present invention conforms or adapts to the distance between the front seat 16 and the occupant 20 in the rear seat 22 by lengthening or expanding in the fore-aft direction during deployment. This fore-aft movement by the air bag 14 helps to ensure the air bag engages the occupant regardless of the distance between front and rear seats 16, 22. Consequently, no gap exists between the fully deployed, conforming air bag 14 of the present invention and the occupant 20 of the rear seat 22. As a result, the air bag 14 provides immediate restraint to the penetrating occupant 20', which helps prevent the occupant from speeding up while traveling towards the front seat 16 and helps reduce the chances the occupant moves inboard or outboard during interaction with the air bag.

FIGS. 4A and 4B illustrate an air bag 14a in accordance with another embodiment of the present invention. Certain components in FIGS. 4A and 4B are similar or identical to components of FIGS. 1-3C. These similar or identical components are given the same reference as FIGS. 1-3C. On the other hand, the suffix "a" is added to the reference numbers of components in FIGS. 4A and 4B that are dissimilar to the components of FIGS. 1-3C to avoid confusion.

In FIGS. 4A and 4B, the lowermost edge of the bottom portion 92 of the air bag 14a is misaligned from the lowermost edge of the top portion 90 relative to the midline 98. As shown, the bottom of the front portion 62 extends below the bottom of the rear portion 64. The inflated air bag 14a is therefore generally hook-shaped or has a misshaped, inverted U-shape. As shown in FIG. 4B, the bottom of the front and rear portions 62, 64 extends outward (inboard and outboard) relative to the remainder of the air bag 14a. More specifically, the bottoms of the front and rear portions 62, 64 have a substantially frustoconical shape while the remainder of the air bag 14a is substantially rectangular when viewed from the top. The seams 100 defining the chambers 102 extend in the fore-aft direction along the length of the air bag 14.

Similar to the air bag 14 of FIGS. 1-3C, the restraint forces of the air bag 14a acting on the penetrating occupant 20' are reduced until the front portion 62 and rear portion 64 contact one another. Further occupant 20 penetration into the air bag 14a results in greater restraint by the air bag. Additionally, the air bag 14a of FIGS. 4A-4B automatically expands in the fore-aft direction to the degree necessary to conform to the distance between the occupant 20 and the front seat 16.

FIGS. 5A-5C illustrate an air bag 14b in accordance with another embodiment of the present invention. In FIGS. 5A-5C, the bottom portion 92 includes a recess or pocket 125 that helps reduce the size of the inflatable volume 60, thereby allowing a smaller inflator 32 to be used. The bottom of the front portion 62 is enlarged on the inboard and outboard sides of the recess 125. The air bag 14b has a generally rectangular shape when viewed from the top. The bottom of the rear portion 64 attached to the front seat 16 has an enlarged, rounded shape compared to the remainder of the rear portion. The seams 100 defining the chambers 102 extend in the fore-aft direction along the length of the air bag 14b.

Similar to the air bag 14a of FIGS. 4A and 4B, the air bag 14b is hook-shaped and the restraint forces of the air bag acting on the penetrating occupant 20' are reduced until the front portion 62 and rear portion 64 contact one another. Further occupant 20 penetration into the air bag 14b results in greater restraint by the air bag. Additionally, the air bag 14a of FIGS. 5A-5C automatically expands in the fore-aft direction to the degree necessary to conform to the distance between the occupant 20 and the front seat 16.

FIGS. 6A and 6B illustrate an air bag 14c in accordance with another embodiment of the present invention. In FIGS. 6A and 6B, the air bag 14c is hook-shaped similar to the air bag 14a of FIGS. 4A and 4B. The air bag 14c, however, is upside-down compared to the air bag 14a (FIG. 4A) such that the space 110 extends through the top portion 90 towards the bottom portion 92 and terminates at an inner surface 128 of the bottom portion 92. The air bag 14c has a generally rectangular shape when viewed from the top. The top of the front portion 62 extends above the top of the rear portion 64. Although the front and rear portions 62, 64 are illustrated as being offset from one another in the vertical direction it will be appreciated that the front and rear portions can alternatively be aligned to form a more symmetric arch- or U-shaped air bag 14c (not shown). The seams 100 defining the chambers 102 extend generally in the fore-aft direction along the length of the air bag 14c.

Similar to the air bag 14 of FIGS. 1-3C, the restraint forces of the air bag 14c acting on the penetrating occupant 20' are reduced until the front portion 62 and rear portion 64 contact one another. Further occupant 20 penetration into the air bag 14*c* results in greater restraint by the air bag. Additionally, the air bag 14*c* of FIGS. 6A and 6B automatically expands in the fore-aft direction to the degree necessary to conform to the distance between the occupant 20 and the front seat 16.

FIGS. 7A-7C illustrate an air bag 14*d* in accordance with another embodiment of the present invention. In FIGS. 7A-7C, the front portion 62 and rear portion 64 are connected together by both the top portion 90 and the bottom portion 92. In other words, the inflated air bag 14*d* forms a rounded or polygonal loop, with the space 110 extending entirely through the air bag 14*d* in the inboard-outboard direction. The space 110 therefore does not extend through either the top portion 90 or the bottom portion 92. The seams 100 defining the chambers 102 extend along the portions 62, 64, 90, 92 of the air bag 14*d* such that the seams encircle the space 110. The seams 100 can extend vertically and/or horizontally to define the chambers 102.

The air bag 14*d* can additionally include one or more retaining portions 140 connected to the front portion 62. As shown, the retaining portions 140 constitute inflatable portions that extend from the front surface 70 adjacent each lateral portion 80, 82 of the air bag 14. Each retaining portion 140 extends lengthwise in the vertical direction along the front portion 62. The retaining portions 140 can extend outward (inboard and outboard) relative to one another or can be parallel to one another (not shown). The retaining portions 140 increase the surface area of the front portion 62 to help protect occupants 20 that move inboard or outboard during penetration into the air bag 14*d*. The retaining portions 140 help minimize occupant head 124 rotation by accounting for laterally oblique impacts with the air bag 14*d*.

Similar to the air bag 14 of FIGS. 1-3C, the restraint forces of the air bag 14*d* acting on the penetrating occupant 20' are reduced until the front portion 62 and rear portion 64 contact one another. Further occupant 20 penetration into the air bag 14*d* results in greater restraint by the air bag. Additionally, the air bag 14*d* of FIGS. 7A-7C automatically expands in the fore-aft direction to the degree necessary to conform to the distance between the occupant 20 and the front seat 16.

FIGS. 8A-8C illustrate an air bag 14*e* in accordance with another embodiment of the present invention. In FIGS. 8A-8C, the inflated air bag 14*e* forms a rounded or polygonal loop, with the space 110 extending vertically through the entire air bag 14*e*. The space 110 therefore does not extend through or to the lateral portions 80, 82 but rather is bounded by the lateral portions. In this embodiment, the retaining portions are omitted but can alternatively be provided on the front portion 62 (not shown). The lateral portions 80, 82 extend outward (inboard and outboard) from the rear portion 64 and outward from one another such that the air bag 14*e* has a generally triangular shape with rounded corners when viewed from the top. The angle between the lateral portions 80, 82 can be adjusted to meet performance criterion. The front portion 62 is thicker in the fore-aft direction than the rear portion 64. The seams 100 for defining the chambers 102 extend horizontally along each portion in the inboard-outboard direction such that the seams encircle the space 110. Additional seams 100 can extend vertically to further help define and tailor the chambers 102.

Similar to the air bag 14 of FIGS. 1-3C, the restraint forces of the air bag 14*e* acting on the penetrating occupant 20' are reduced until the front portion 62 and rear portion 64 contact one another. Further occupant 20 penetration into the air bag 14*e* results in greater restraint by the air bag. Additionally, the air bag 14*e* of FIGS. 8A-8C automatically expands in the fore-aft direction to the degree necessary to conform to the distance between the occupant 20 and the front seat 16.

FIGS. 9A and 9B illustrate an air bag 14*f* in accordance with another embodiment of the present invention. The air bag 14*f* is similar to the air bag 14*e* of FIGS. 8A-8C. The air bag 14*f*, however, includes one or more support members 150 extending between and connecting the lateral portions 80, 82 for maintaining the lateral portions at a predetermined orientation or angle from one another. The support members 150 can constitute or include non-inflatable portions, such as elastic or inelastic tethers or pieces of fabric. The support members 150 can be positioned at the uppermost edge of the air bag 14*f* and/or at the lowermost edge of the air bag (not shown).

The support members 150 bring the lateral portions 80, 82 closer to parallel with one another, which increases the stiffness of the air bag 14*f*. By pulling the lateral portions 80, 82 closer together the inboard-outboard depth of the space 110 is reduced, and the lateral portions extend closer to a direction along the fore-aft direction of the vehicle 12. In this construction the lateral portions 80, 82 are compressed during occupant 20 penetration more along their length, as opposed to being compressed at an angle. The support members 150 also help prevent outward bowing of the lateral portions 80, 82 during occupant 20 restraint. Alternatively or additionally, the support members 150 can extend between the seams 100 to serve the same purpose (not shown).

The seams 100 defining the chambers 102 extend horizontally along each portion 62, 64, 80, 82, 90, 92 in the inboard-outboard direction such that the seams encircle the space 110. Additional seams 100 can extend vertically to further help define the chambers 102. The seams 100 are also configured such that the chambers 102 of the air bag 14*f* are concave. In other words, the chambers 102 of the air bag 14*f* curve inwards towards the space 110, thereby reducing the inflated volume of the air bag.

Similar to the air bag 14 of FIGS. 1-3C, the restraint forces of the air bag 14*f* acting on the penetrating occupant 20' are reduced until the front portion 62 and rear portion 64 contact one another. Further occupant 20 penetration into the air bag 14*f* results in greater restraint by the air bag. Additionally, the air bag 14*f* of FIGS. 9A-9C automatically expands in the fore-aft direction to the degree necessary to conform to the distance between the occupant 20 and the front seat 16.

FIGS. 10A-and 10B and FIGS. 11A-and 11B illustrate air bags 14*g*, 14*h* having substantially similar configurations to the air bag 14*f* of FIGS. 9A-9C. The air bags 14*g*, 14*h* both include one or more support members 150, with the space 110 in the air bags 14*g*, 14*h* being slightly modified from the space 110 in the air bag 14*f*.

FIGS. 12A-12B illustrate an air bag 14*i* in accordance with another embodiment of the present invention. In FIGS. 12A-12B, the top portion 90 has a greater thickness $t_1$, e.g., chamber 102 thickness, than the thickness of either the front portion 62 or the rear portion 64. The increased thickness in the top portion 90 provides greater restraint to the penetrating occupant 20'. The air bag 14*i* has a generally rectangular shape when viewed from the top. The seams 100 defining the chambers 102 extend in the fore-aft direction along the length of the air bag 14*b*. The seams 100 are configured to provide the top portion 90 with an enlarged volume relative to the volume of the lobes 120. The lobe 120 nearest the occupant 20 has a substantially constant thickness $t_2$ in the fore-aft direction along its length from the top portion 90 to its lowermost edge adjacent the occupant's lower torso 122.

Similar to the air bag 14a of FIGS. 4A and 4B, the air bag 14i is hook-shaped and the restraint forces of the air bag acting on the penetrating occupant 20' are reduced until the front portion 62 and rear portion 64 contact one another. Further occupant 20 penetration into the air bag 14i results in greater restraint by the air bag. Additionally, the air bag 14i of FIGS. 12A-12B automatically expands in the fore-aft direction to the degree necessary to conform to the distance between the occupant 20 and the front seat 16.

Referring to FIG. 13, in accordance with another aspect of the present invention, an air bag 14' is configured to be secured to and deployable from the roof 19 of the vehicle 12. Consequently, in this configuration the roof 19 of the vehicle 12 acts as a reaction surface for the deploying air bag 14' and the distance D1 has a component in both the fore-aft direction and a vertical direction. The air bag 14' can constitute any one of the previously described air bags 14-14c. The air bag module 30 is positioned within the roof 19 such that the air bag 14' deploys downward towards the occupant 20 between the front seat 16 and the rear seat 22. The air bag 14' can be similar to the air bags 14-14c in FIGS. 1, 4A, 5A or 6A and, thus, the air bag can be hooked, arcuate or U-shaped.

In any case, the air bag 14' includes the space 110 that allows the deploying air bag to conform to a variety of seat 16, 22 conditions. The air bag 14' can deploy in a direction towards the occupant 20 such that the front portion 62 moves aft in the vehicle relative to the rear portion 64 until the front portion abuts the rear seat occupant. In other words, the roof-mounted air bag 14' behaves similar to the front seat mounted air bag 14-14c. One or more tethers (not shown) can connect the front portion 62 to the vehicle roof 19 to control deployment of the air bag 14' and movement of the front portion 62 relative to the rear portion 64.

FIGS. 14 and 15 illustrate air bags 14j, 14k configured to be secured to and deployable from the instrument panel 36, with the side 24 constituting the passenger side of the vehicle 12. Consequently, in this configuration the instrument panel 36 acts as a reaction surface for the deploying air bags 14j, 14k. Alternatively, the air bags 14j, 14k can be secured to and deployable from a steering wheel (not shown) on the driver side of the vehicle 12, with the steering wheel thereby acting as the reaction surface. Moreover, it will be appreciated that either air bag 14j or 14k can constitute any one of the previously described air bags 14-14i (not shown).

Referring to FIG. 14, the air bag module 30 is positioned within the instrument panel 36 such that the air bag 14j deploys in the fore-aft direction towards the occupant 20 between the instrument panel and the front seat 16. The lobe 120 on the rear portion 64 is spaced from the opening 44 in the housing 34 and positioned aft of the instrument panel 36.

The air bag 14j includes the space 110 that allows the deploying air bag to conform to a variety of front seat 16 conditions relative to the instrument panel 36. The air bag 14j can therefore deploy in a direction towards the front seat occupant 20 such that the front portion 62 moves aft in the vehicle relative to the rear portion 64 until the front portion abuts the occupant. In other words, the instrument panel-mounted air bag 14j of FIG. 14 automatically expands in the fore-aft direction to the degree necessary to conform to the distance between the front seat occupant 20 and the instrument panel 36 reaction surface. Furthermore, similar to the air bags 14-14i of FIGS. 1-12B, the restraint forces of the air bag 14j acting on the penetrating occupant 20' are reduced until the front portion 62 and rear portion 64 contact one another. Further occupant 20 penetration into the air bag 14j therefore results in greater restraint by the air bag.

Referring to FIG. 15, the air bag module 30 is positioned within the instrument panel 36 such that the air bag 14k deploys in the fore-aft direction towards the occupant 20 between the instrument panel and the front seat 16. The lobe 120 on the rear portion 64 extends through the opening 44 in the housing 34 and towards the roof 19 of the vehicle 12.

The air bag 14k includes the space 110 that allows the deploying air bag to conform to a variety of front seat 16 conditions relative to the instrument panel 36. The air bag 14k can deploy in a direction towards the front seat occupant 20 such that the front portion 62 moves aft in the vehicle relative to the rear portion 64 until the front portion abuts the front seat occupant. In other words, the instrument panel-mounted air bag 14k of FIG. 15 automatically expands in the fore-aft direction to the degree necessary to conform to the distance between the front seat occupant 20 and the instrument panel 36 reaction surface.

Furthermore, similar to the air bags 14-14j of FIGS. 1-12B and 14, the restraint forces of the air bag 14k acting on the penetrating occupant 20' are reduced until the front portion 62 and rear portion 64 contact one another. Further occupant 20 penetration into the air bag 14k therefore results in greater restraint by the air bag.

Figure 16:
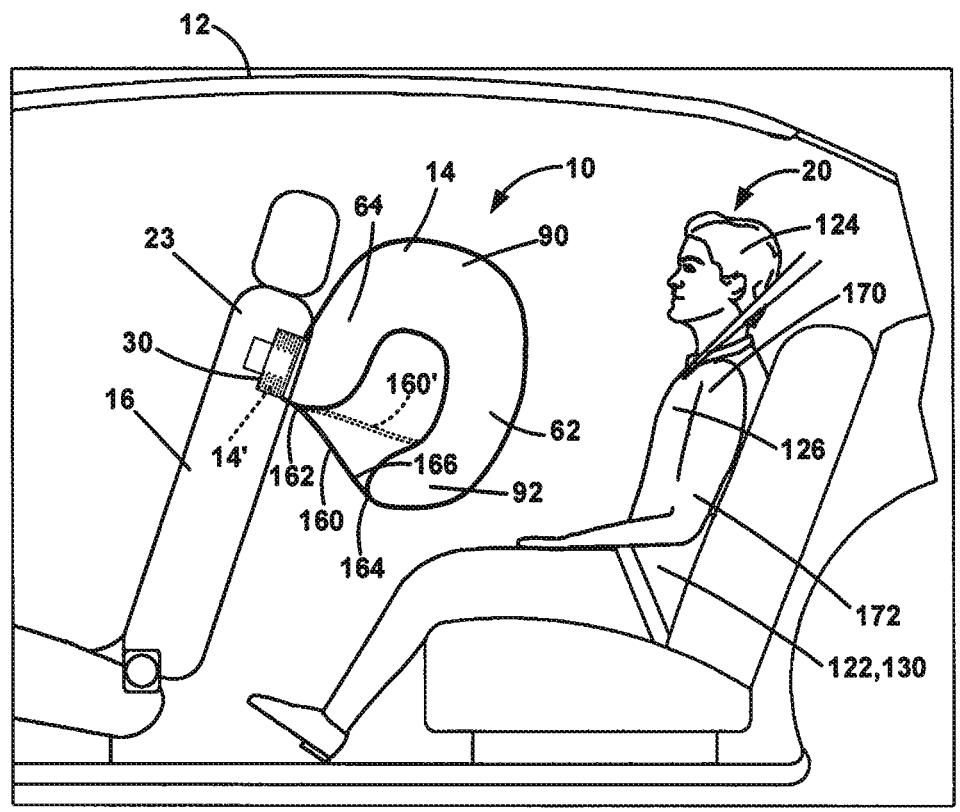
FIGS. 16 and 17 illustrate schematically a feature that can be implemented with the apparatus as shown in any of the embodiments disclosed herein.
Figure 17:
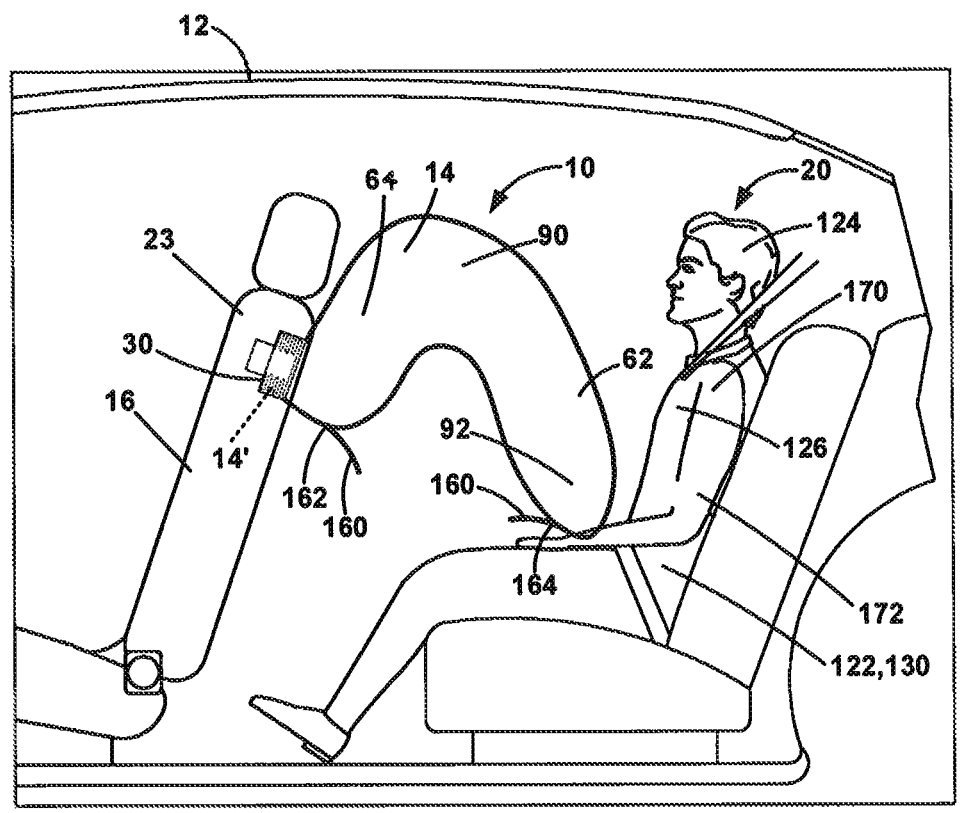

FIGS. 16 and 17 illustrate a feature that can be implemented in any of the air bag configurations disclosed herein. Because of this, the air bag is illustrated generally at 14 with the understanding that the air bag is representative of all embodiments disclosed herein, regardless of the reference numbers with which they are referred to. As shown in FIGS. 16 and 17 the air bag 14 forms part of an air bag module 30 that is mounted to or within a seat back 23 of a vehicle seat 16 positioned forward or in front of the vehicle occupant 20 that the air bag is intended to protect.

In the example configuration of FIGS. 16 and 17, the air bag 14 includes an external deployment tether 160 for helping to control deployment of the air bag. The deployment tether 160 has a first end 162 and an opposite second end 164. The first end 162 can be connected to the air bag 14 at a location positioned close to the air bag module 30, such as to the rear portion 64 of the air bag. In one particular example, the first end 162 of the deployment tether 160 can be connected to the rear portion 64 of the air bag 14 adjacent or near a mouth portion of the air bag through which inflation fluid is directed from the inflator into the air bag.

The second end 164 of the deployment tether 160 is connected to the air bag 14 at a position spaced from the connection of the first end 162. In the example configuration of FIGS. 16 and 17, the second end 164 is connected to the front portion 62 of the air bag 14. More specifically, as shown in the example configuration of FIGS. 16 and 17, the second end 164 of the deployment tether 160 can be connected to the front portion 62 at, adjacent, or near the bottom portion 92 of the front portion. The second end 164 of the deployment tether 160 could, however, be connected to the front portion 62 at a location other than the bottom portion 92, as indicated generally in dashed lines at 160' in FIG. 16.

Advantageously, the deployment tether 160 restricts or otherwise restrains the front portion 62, generally, and the front bottom portion 92, more specifically, upon initial inflation and deployment of the air bag 14. As shown in FIG. 16, as the air bag 14 inflates and deploys away from the seat back 23, the deployment tether 160 holds back the bottom portion 92 from deploying toward the occupant 20. Meanwhile, the top portion 90 and the rear portion 64 are permitted to inflate and deploy to their respective deployed positions. As pressure builds in the air bag 14, the front portion 62 is urged toward its deployed position, but is restricted by the deployment tether 160. This causes tension to build in the deployment tether 160. When the air bag pressurization and the resulting tension reach a predetermined level, the deployment tether 160 releases, allowing the front portion 62 (including bottom portion 92) to move to the deployed position.

The deployment tether 160 can be configured to release in a variety of manners. For example, the deployment tether 160 can include a tear seam along which the tether is configured to rupture or tear when tension on the tether reaches a predetermined level. Alternatively, the deployment tether 160 can be secured to the air bag 160 by tear stitching that is configured to rupture and release the connection of the tether to the air bag when the tension on the tether reaches the predetermined level. In the embodiment illustrated in FIGS. 16 and 17, the deployment tether 160 includes a tear seam 166 along which the tether ruptures.

The deployment tether 160 helps prevent the front portion 62 from overshooting the deployed position that it is configured to reach when the air bag 14 is inflated. The intended deployed position is that illustrated in FIG. 17. By "overshooting," it is meant to refer to the possibility that the front portion will move beyond the intended deployed position due to the momentum resulting from inflation. Overshooting could result in the air bag 14 falling to reach the intended deployed position at the time the occupant 20 impacts the bag. The inclusion of the deployment tether 160 slows the momentum of the front portion 62 of the air bag 14 and therefore helps prevent this from occurring.

Figure 19:
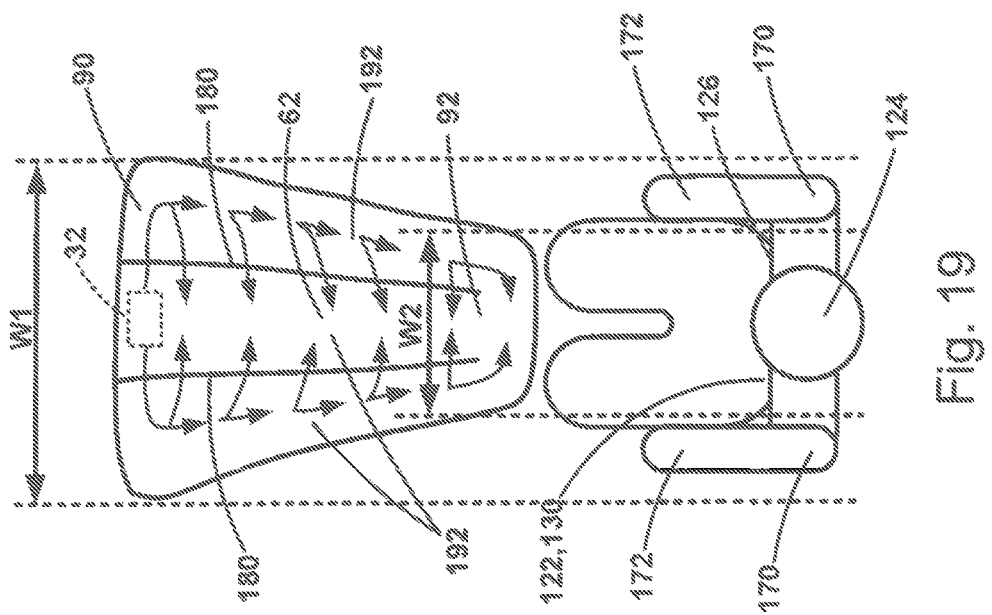
FIGS. 18 and 19 illustrate schematically a configuration of the apparatus that can be implemented in any of the embodiments disclosed herein.
Figure 18:
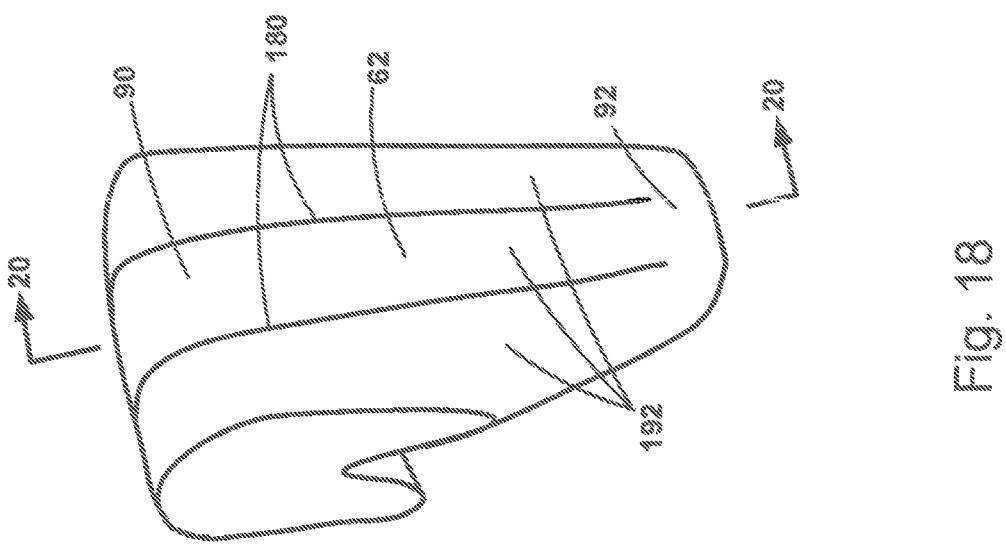

FIGS. 18 and 19 illustrate an air bag configuration that can be implemented in any of the air bags disclosed herein. Because of this, the air bag is illustrated generally at 14 with the understanding that the air bag is representative of all relevant embodiments disclosed herein, regardless of the reference numbers with which they are referred to. For example, the air bag 14 configuration of FIGS. 18 and 19 can be implemented in the air bag of FIGS. 16 and 17.

In the example configuration of FIGS. 18 and 19, the air bag 14 includes a front portion 62 that is tapered from wide at the top portion 90 of the bag to narrow at the bottom 92 of the bag. This wide to narrow, top to bottom tapered configuration is selected to coincide with, or correspond to, portions of the occupant 20 that impact certain portions of the air bag 14. As shown in FIG. 19, and referring also to FIGS. 16 and 17 for reference, the upper portion 90 has a width, illustrated generally at W1 in FIG. 19 that covers the width of the occupant's upper torso 126 and shoulders 170, and thereby can receive those portions along with the occupant's head 124.

The front portion 62 tapers down to a width, illustrated generally at W2, at the lower portion 92 that covers the width of the occupants lower torso 122 and hips 130, while being positioned between the shoulders 170 and arms 172. As such, the front portion covers the lower torso 122 and hips 130 while at the same time avoiding interference from the occupant's arms 172. This provides several advantages. The air bag taper avoids the air bag 14 engaging and accelerating the occupant's arms 172 during deployment, which could cause injury. The air bag taper also avoids the occupants arms 172 interfering with timely, precise deployment of the air bag 14.

To be specific and clear, when referring to the width of the front portion 62, including the widths W1 and w2, it is meant to refer to the dimension of the air bag 14 measured laterally across the face of the air bag that is presented facing the occupant 20 when the air bag 14 is in the normally inflated and deployed condition and the occupant is in the normally seated position, i.e., as shown in FIGS. 16, 17, and 19. The width of the front portion 62 of the air bag 14 thus coincides with lateral measurements of the occupant, such as laterally across the shoulders, laterally across the chest, laterally across the torso, laterally across the hips, etc. Additionally, when the air bag 14 or portions thereof (such as the front portion 62) are described as being configured to "cover" a portion of the occupant 20, it is meant that the width, measured across the width of the air bag in the manner of dimensions W1 and/or W2 (see, FIG. 19), is sufficient to be positioned between the stated portion of the occupant and the vehicle seat 16 positioned in front of the occupant.

Referring to FIGS. 18-20, the air bag 14 includes seams 180 where front and rear panels 182, 184 are interconnected via an internal tether 190. In the embodiment illustrated in FIGS. 18-20, there are two such seams 180 and, therefore, two tethers 190. The tethers maintain a desired thickness of the air bag 14, which is indicated generally at T in FIG. 20. As shown in FIG. 20, the desired thickness T of the air bag 14 can vary along its length. The tether 190 maintains this desired thickness.

Additionally, the tethers 190 create inflatable chambers 192 within the air bag 14. In the example configuration of FIGS. 18-20, the tethers 190 create three such chambers 192. The number of chambers 192 could, however, be greater or fewer. The tether 190 includes openings 194 that permit inflation fluid to move between the chambers 192. This helps to ensure even pressurization between the chambers 192, which promotes even, rapid, and consistent inflation and deployment of the air bag 14.

Furthermore, the tethers 190 and the chambers 192 can be configured such that the inflation fluid from the inflator 32 enters the outer chambers of the air bag 14 directly. In this instance, inflation fluid enters the inner (middle) chamber 192 only through the openings 194 in the tethers 190. This outside-in inflation of the air bag 14 is indicated generally by the flow arrows emanating from the inflator 32 in FIG. 19. The outside-in inflation helps deploy the air bag 14 quickly, with the outer chambers 192 moving quickly into position and pulling along or otherwise urging the center chamber to move with them. The air bag 14 can thus be moved into the desired deployed position more rapidly than if the entire inflatable volume of the air bag was inflated at once.

While the outer chambers 192 are deployed and inflated first, the center chamber fills quickly thereafter. It will be appreciated that inflation fluid will begin to enter the center chamber 192 through the holes 194 shortly after inflation and deployment of the outer chambers begins. Therefore, the inflation and deployment of the center chamber does not occur after the outer chambers, but rather in a delayed manner such that the initial inflation/deployment of the center chamber is delayed. After this initial delay, all three chambers 192 inflate and deploy substantially simultaneously, with the outer chambers reaching full inflation and deployment before the center chamber. The center chamber 192 is moved to the deployed position quickly due to the deployment of the outer chambers and fully inflates and pressurizes shortly thereafter.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect a rear seat occupant of a vehicle, the apparatus comprising:
   an air bag having a stored condition in a housing mounted to or within a seatback of a vehicle seat positioned in front of the rear seat occupant, the air bag comprising one or more panels of material interconnected to define an inflatable volume and having a substantially U-shaped configuration when viewed from the side, the U-shaped air bag comprising a first portion that forms one leg of the U-shaped air bag, a second portion that forms another leg of the U-shaped air bag and includes a front portion presented facing the rear seat occupant, and a third portion that interconnects the first and second portions, wherein the air bag is configured to have a deployed condition in which the first portion is configured to be positioned adjacent the seatback and the second portion is configured to be positioned between the first portion and the rear seat occupant; and
   a deployment tether having a first end connected to the first portion of the air bag and an opposite second end connected to the second portion of the air bag, the deployment tether being configured to restrict initial deployment of the second portion of the air bag, the deployment tether comprising a rupturable portion configured to release the second portion of the air bag after the first and third portions reach a predetermined stage of deployment and the air bag reaches a predetermined degree of pressurization.

2. The apparatus recited in claim 1, wherein the first and second portions are configured to be spaced from each other in a fore-aft direction in the vehicle when the air bag is in the deployed condition.

3. The apparatus recited in claim 2, wherein the third portion spaces the first and second portions in the fore-aft direction.

4. The apparatus recited in claim 1, wherein the air bag is configured so that when inflated its U-shaped configuration is inverted such that the third portion forms a top portion of the air bag.

5. The apparatus recited in claim 1, wherein the second portion of the air bag is configured to move toward the first portion in response to occupant penetration, the first portion being configured to rest against the seatback of the vehicle seat in front of the occupant, which acts as a reaction surface for the first and second portions.

6. The apparatus recited in claim 5, wherein the air bag provides a first restraint to occupant penetration when the first portion is spaced from the second portion, the first restraint owing primarily to pressurization of the air bag, and wherein penetration of the occupant into the second portion a predetermined degree causing the second portion to engage the first portion such that the air bag has a second restraint to occupant penetration greater than the first restraint, owing to the reaction surface of the seatback.

7. The apparatus recited in claim 1, further comprising a plurality of seams interconnecting the one or more panels to define a plurality of chambers within the inflatable volume of the air bag.

8. The apparatus recited in claim 7, wherein the inflatable chambers are longitudinal chambers that extend the length of the U-shaped air bag and therefore each have U-shaped configurations.

9. The apparatus recited in claim 7, wherein the seams comprise internal tethers that interconnect the panels, the internal tethers comprising holes that permit inflation fluid to move between the chambers.

10. The apparatus recited in claim 9, wherein the air bag is configured such that inflation fluid directed into the inflatable volume from an inflator enters outer chambers of the air bag, a portion of the inflation fluid entering one or more central chambers positioned between the outer chambers through the holes in the internal tethers.

11. The apparatus recited in claim 1, wherein the second portion of the air bag has a width that tapers from wide at a top portion of the front portion of the air bag to narrow at a bottom portion of the front portion of the air bag.

12. The apparatus recited in claim 11, wherein the width of the top portion of the second portion of the air bag is configured to cover a shoulder width of the vehicle occupant, and the width of the bottom portion of the second portion of the air bag is configured to cover the hip width and lower torso width of the occupant while terminating between the shoulders and arms of the occupant.

13. The apparatus recited in claim 7, wherein the seams are configured to vary the inflated stiffness of the chambers across the width of the air bag.

14. The apparatus recited in claim 7, wherein central chambers are configured to have a stiffness that is reduced from the stiffness of outer chambers.

15. The apparatus recited in claim 7, wherein the seams are configured to vary the volume of the chambers.

* * * * *